US010524207B2

(12) United States Patent
Tsuzuki

(10) Patent No.: US 10,524,207 B2
(45) Date of Patent: Dec. 31, 2019

(54) COMMUNICATION APPARATUS CAPABLE OF CHANGING OPERATING STATE OF WIRELESS INTERFACE

(71) Applicant: Brother Kogyo Kabushiki Kaisha, Nagoya-shi, Aichi-ken (JP)

(72) Inventor: Ryosuke Tsuzuki, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/837,651

(22) Filed: Aug. 27, 2015

(65) Prior Publication Data
US 2016/0066275 A1  Mar. 3, 2016

(30) Foreign Application Priority Data

Aug. 29, 2014 (JP) .................................. 2014-175272

(51) Int. Cl.
*H04W 52/02* (2009.01)
*H04W 76/27* (2018.01)
*H04W 24/00* (2009.01)

(52) U.S. Cl.
CPC ....... *H04W 52/0235* (2013.01); *H04W 24/00* (2013.01); *H04W 52/0222* (2013.01);
(Continued)

(58) Field of Classification Search
CPC ............. H04W 52/0235; H04W 24/00; H04W 52/0222; H04W 52/0251; H04W 76/00
See application file for complete search history.

(56) References Cited

U.S. PATENT DOCUMENTS 5,602,567 A * 2/1997 Kanno ................... G09G 1/165
                                                          345/11
5,673,308 A * 9/1997 Akhavan ................. H04W 4/16
                                                          455/417
(Continued)

FOREIGN PATENT DOCUMENTS

JP  2004-178196 A  6/2004
JP  2010-245778 A  10/2010
(Continued)

OTHER PUBLICATIONS

Wi-Fi Alliance Technical Committee P2P Task Group, "Wi-Fi Peer-to Peer (P2P) Technical Specification", Version 1.1, pp. 1-159.
(Continued)

*Primary Examiner* — Brandon M Renner
*Assistant Examiner* — Jay L Vogel
(74) *Attorney, Agent, or Firm* — Banner & Witcoff, Ltd.

(57) ABSTRACT

One communication apparatus may include a first wireless interface and a controller. The controller is configured to perform: changing the operating state of the first wireless interface from a first state to a second state when the controller is to start a predetermined process during a first period in which the controller is not performing a predetermined process; performing the predetermined process during a second period in which the operating state of the first wireless interface is the second state, the second period being a period after the operating state of the first wireless interface has been changed to the second state; and changing the operating state of the first wireless interface from the second state to the first state in response to the predetermined process being completed.

14 Claims, 10 Drawing Sheets

(52) U.S. Cl.
CPC ....... *H04W 52/0251* (2013.01); *H04W 76/27* (2018.02); *Y02D 70/00* (2018.01); *Y02D 70/142* (2018.01); *Y02D 70/144* (2018.01); *Y02D 70/166* (2018.01); *Y02D 70/22* (2018.01)

(56) References Cited

U.S. PATENT DOCUMENTS

| | | | | |
|---|---|---|---|---|
| 5,943,376 | A * | 8/1999 | Proctor | H04J 3/0605 370/506 |
| 9,025,579 | B2 * | 5/2015 | Kwon | H04W 76/026 370/338 |
| 9,092,178 | B2 | 7/2015 | Aritomi | |
| 9,100,774 | B2 | 8/2015 | Suzuki et al. | |
| 9,665,328 | B2 | 5/2017 | Yamaoka | |
| 2004/0246913 | A1 * | 12/2004 | Gassho | H04W 88/04 370/254 |
| 2007/0241188 | A1 * | 10/2007 | Liao | G06Q 10/06 235/383 |
| 2008/0130046 | A1 | 6/2008 | Gassho et al. | |
| 2008/0254841 | A1 * | 10/2008 | Miyata | H04B 1/406 455/574 |
| 2010/0198032 | A1 * | 8/2010 | Simpson | A61B 5/0002 600/365 |
| 2010/0246477 | A1 * | 9/2010 | Hasegawa | H04L 1/1893 370/315 |
| 2010/0254314 | A1 * | 10/2010 | Tsuchiya | H04W 84/18 370/328 |
| 2011/0058500 | A1 * | 3/2011 | Nagasaki | H04W 8/183 370/254 |
| 2012/0159105 | A1 * | 6/2012 | von Behren | G06Q 20/3552 711/164 |
| 2013/0081121 | A1 * | 3/2013 | Green | H04L 9/0827 726/7 |
| 2013/0215467 | A1 * | 8/2013 | Fein | G06F 3/1204 358/1.15 |
| 2013/0229672 | A1 | 9/2013 | Naruse | |
| 2013/0260683 | A1 | 10/2013 | Suzuki et al. | |
| 2014/0191846 | A1 * | 7/2014 | Zhao | G06K 19/0723 340/10.1 |
| 2014/0213190 | A1 | 7/2014 | Yamaoka | |
| 2014/0233058 | A1 | 8/2014 | Aritomi | |
| 2014/0269764 | A1 * | 9/2014 | Borgeson | H04L 12/40006 370/468 |
| 2015/0036176 | A1 * | 2/2015 | Naruse | H04N 1/00925 358/1.15 |
| 2015/0098271 | A1 * | 4/2015 | Lasser | G11C 7/1006 365/185.11 |
| 2015/0169027 | A1 * | 6/2015 | Akiba | G06F 1/3209 713/320 |

FOREIGN PATENT DOCUMENTS

| | | |
|---|---|---|
| JP | 2013-186505 A | 9/2013 |
| JP | 2013-214804 A | 10/2013 |
| JP | 2014-149666 A | 8/2014 |
| JP | 2014-157532 A | 8/2014 |

OTHER PUBLICATIONS

Apr. 17, 2018—(JP) Notification of Reasons for Rejection—App 2014-175272, Eng Tran.

Aug. 28, 2018—(JP) Notification of Reasons for Rejection—App 2014-175272, Eng Tran.

\* cited by examiner

FIG. 3 (First to Third Embodiments)

(First Embodiment)

(Second Embodiment)

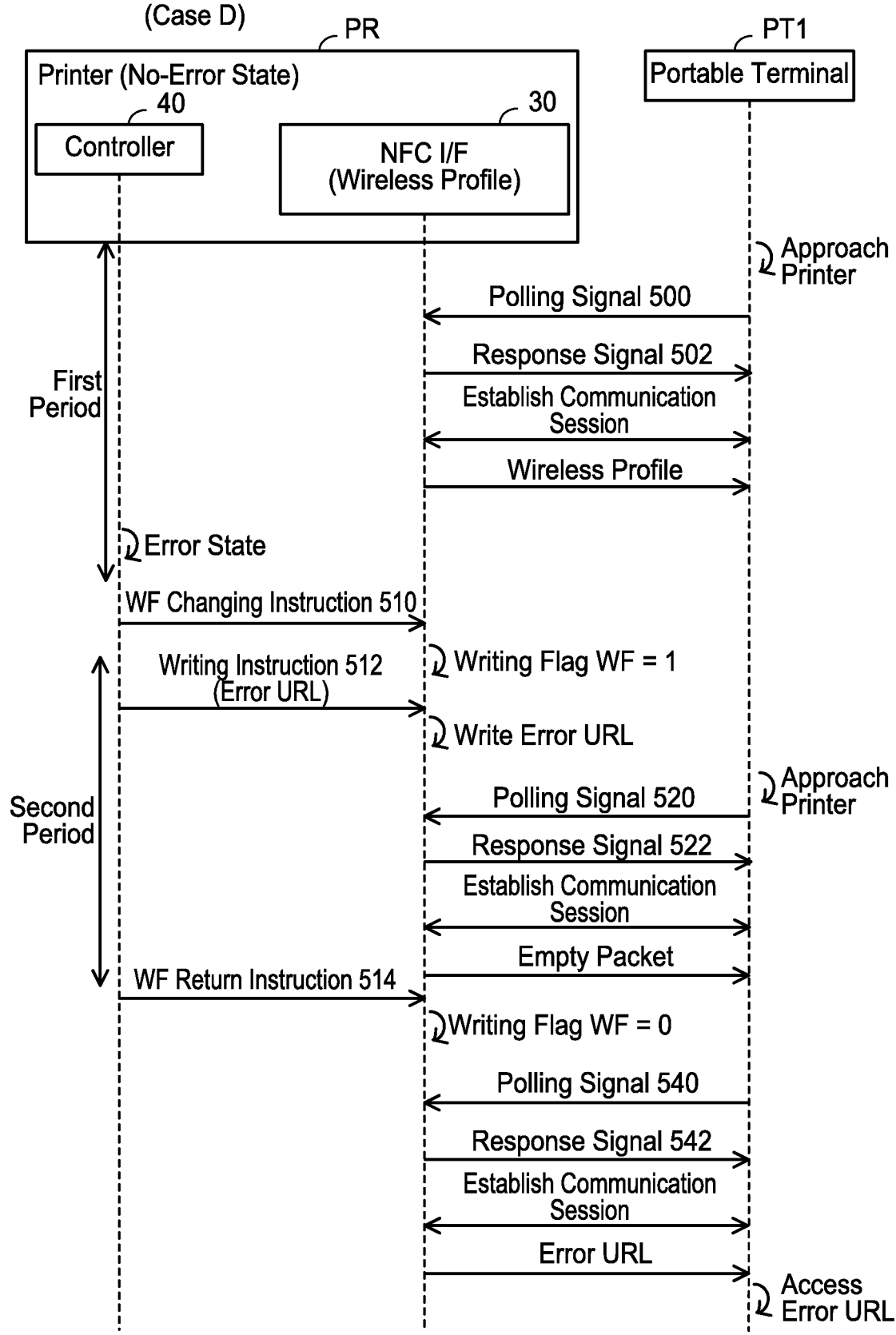

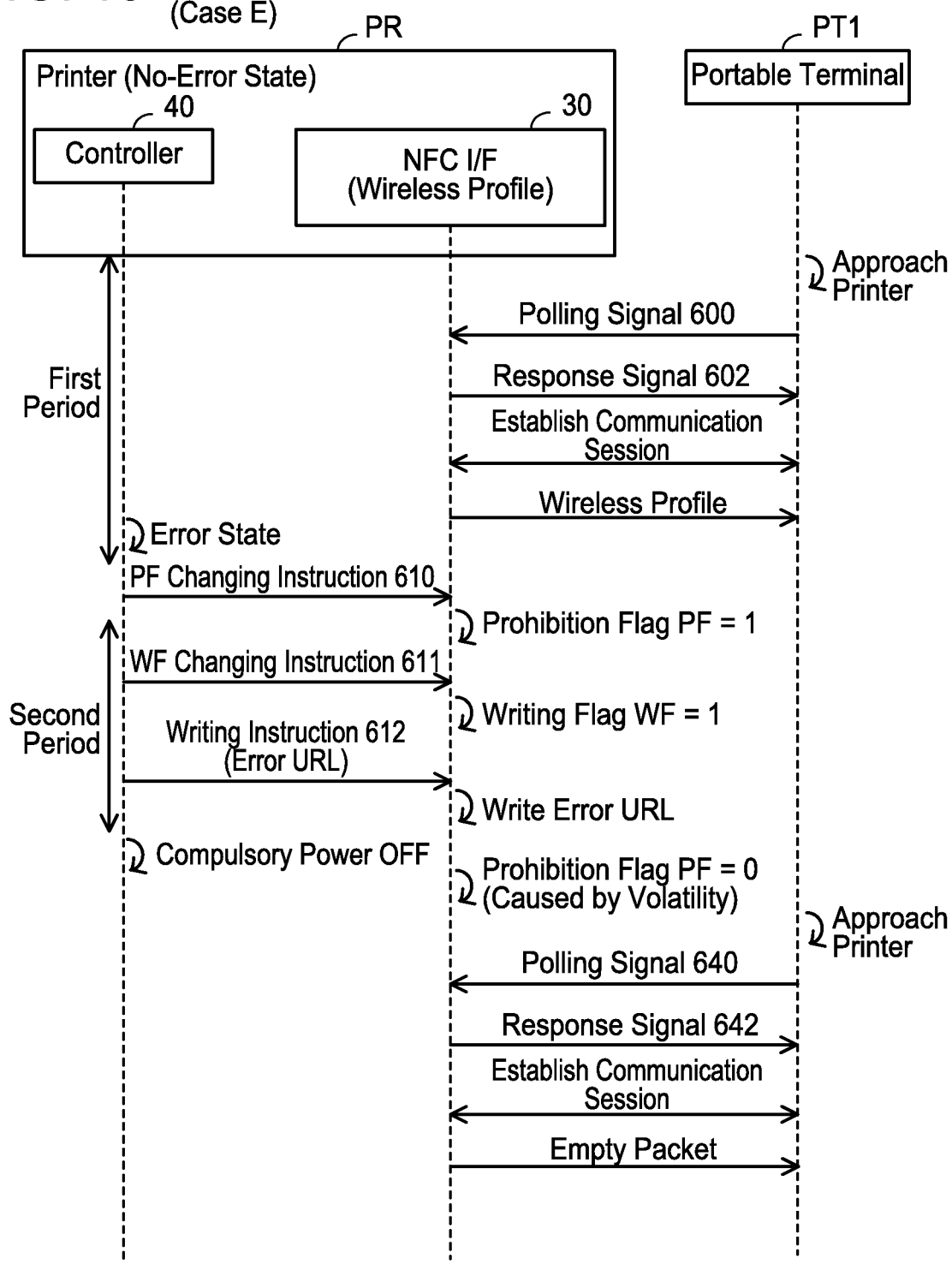

COMMUNICATION APPARATUS CAPABLE OF CHANGING OPERATING STATE OF WIRELESS INTERFACE

CROSS-REFERENCE TO RELATED APPLICATIONS

This application claims priority to Japanese Patent Application No. 2014-175272, filed on Aug. 29, 2014, the contents of which are hereby incorporated by reference into the present application.

TECHNICAL FIELD

The present specification discloses a communication apparatus including a wireless interface.

BACKGROUND ART

A multi-function apparatus comprising an NFC (abbreviation of Near Field Communication) interface for performing a wireless communication of an NFC scheme and a wireless LAN interface for performing a wireless communication of a WFD (abbreviation of Wi-Fi Direct (registered trademark)) scheme has been known. The multi-function apparatus is operated in a Group Owner state (hereinafter referred to as the "G/O state") of the WFD scheme so as to form a wireless network of the WFD scheme. The multi-function apparatus sends a wireless setting of the wireless network to a portable terminal via the NFC interface. Thus, the portable terminal joins to the wireless network, and the multi-function apparatus receives print data from the portable terminal via the wireless LAN interface, using the wireless network.

SUMMARY

There may be a situation where a wireless setting of a wireless network should not be sent to a portable terminal via an NFC interface. However, in the above-described multi-function apparatus, presence of such a situation is not at all considered. Provided herein is a technology that the communication apparatus may appropriately send target data in a memory of a wireless interface to an external apparatus.

A communication apparatus taught in the present specification may comprise a first wireless interface that comprises a first memory and a processor; and a controller. The processor may be configured to perform: a writing process of writing target data in the first memory in accordance with a writing instruction obtained from the controller, the target data being data to be sent to an external apparatus; and a sending process of sending the target data in the first memory to the external apparatus. The first wireless interface may be configured to operate in any one of a plurality of operating states including a first state and a second state. The first state may be a state in which the processor is capable of performing the sending process. The second state may be a state in which the processor is not capable of performing the sending process. The controller may be configured to perform: changing the operating state of the first wireless interface from the first state to the second state, when the controller is to start a predetermined process during a first period in which the controller is not performing the predetermined process; performing the predetermined process during a second period in which the operating state of the first wireless interface is the second state, the second period being a period after the operating state of the first wireless interface has been changed to the second state; and changing the operating state of the first wireless interface from the second state to the first state in response to the predetermined process being completed.

A method and computer-readable instructions for implementation of the communication apparatus described above, and a non-transitory computer-readable recording medium in which the computer-readable instructions are stored, are also novel and useful. Furthermore, a system comprising the communication apparatus and the external apparatus is also novel and useful.

BRIEF DESCRIPTION OF DRAWINGS

FIG. 9 shows a sequence diagram of case D according to the second embodiment.
FIG. 10 shows a sequence diagram of case E according to the third embodiment.

EMBODIMENT

First Embodiment

Configuration of Communication System 2

Figure 1:
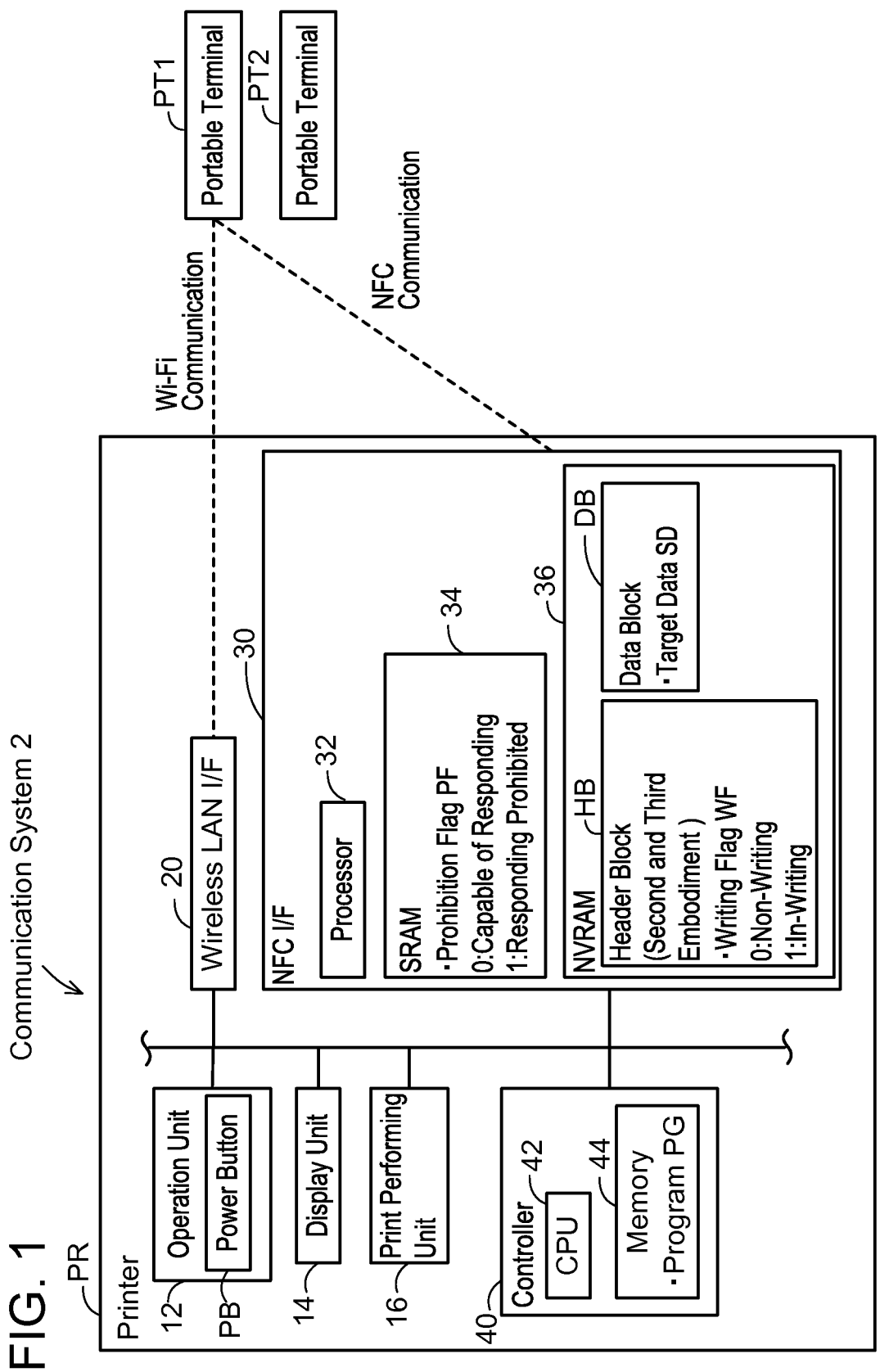
FIG. 1 shows a configuration of a communication system.

As shown in FIG. 1, the communication system 2 includes a printer PR and a plurality of portable terminals PT1 and PT2. Each of PR, PT1, and PT2 is capable of performing wireless communication in accordance with the Wi-Fi scheme (hereinafter referred to as the "Wi-Fi communication") and wireless communication in accordance with a NFC (abbreviation of Near Field Communication) (hereinafter referred to as the "NFC communication").

Configuration of Printer PR

The printer PR is a peripheral capable of performing a print function (i.e., a peripheral of the portable terminals PT1 and PT2 and the like). The printer PR includes an operation unit 12, a display unit 14, a print performing unit 16, a wireless local area network (LAN) interface 20, an NFC interface 30, and a controller 40. Each of the sections 12 to 40 is connected to a bus wire (a reference numeral is omitted). The interface is hereinafter referred to as "I/F".

The operation unit 12 includes a plurality of buttons including a power button PB. A user can provide various instructions to the printer PR by operating the operation unit 12. The power button PB is a button for switching the power of the printer PR between the ON state and the OFF state. The power button PB is a so-called soft button. Thus, when the power button PB is operated while the power of the printer PR is in the ON state, the controller 40 is capable of performing various processes for switching the power of the printer PR from the ON state to the OFF state and thereafter switches the power of the printer PR from the ON state to the OFF state. The display unit 14 is a display for displaying various pieces of information. The print performing unit 16 is a printing mechanism of an ink-jet type, a laser type, or the like.

The wireless LAN I/F 20 is a wireless I/F for performing Wi-Fi communication in accordance with the Wi-Fi scheme. The Wi-Fi scheme is, for example, a wireless communication scheme for performing wireless communication in accordance with the IEEE (abbreviation of Institute of Electrical and Electronics engineers, Inc.) 802.11 standards and standards based thereon (for example, 802.11a, 11b, 11g, 11n, and the like). The wireless LAN I/F 20 specifically supports a WFD (abbreviation of Wi-Fi Direct) scheme. The WFD scheme is a wireless communication scheme described in written standards "Wi-Fi Peer-to-Peer (P2P) Technical Specification Version 1.1" prepared by Wi-Fi Alliance.

NFC I/F 30 is a wireless I/F for performing NFC communication (i.e., a kind of so-called near field wireless communication) in accordance with the NFC scheme. The NFC scheme is, for example, a wireless communication scheme based on the International Standard ISO/IEC 21481 or 18092. As the kinds of I/F for performing the NFC communication, an I/F called an NFC Forum Device and an I/F called an NFC Forum Tag are known. The NFC I/F 30 is an NFC Forum Tag and performs as an IC tag of the NFC scheme.

The NFC I/F 30 includes a processor 32, an SRAM 34, and an NVRAM 36. The processor 32 can communicate with the controller 40 and performs a writing process for writing target data SD to be sent to a portable terminal in the NVRAM 36 in accordance with a writing instruction obtained from the controller 40. The processor 32 performs the following sending process when receiving a Polling signal from the portable terminal (for example, PT1). That is, in the sending process, the processor 32 firstly sends a response signal in response to a Polling signal to the portable terminal to establish a communication session with the portable terminal. Then, the processor 32 reads the target data SD written in the NVRAM 36 in advance prior to the establishment of the communication session with the portable terminal from the NVRAM 36 and sends the target data SD to the portable terminal using the communication session.

The processor 32 performs the writing process in accordance with a writing instruction obtained from the controller 40 using the electric power supplied from the power of the printer PR. Thus, when the power of the printer PR is in the OFF state, the processor 32 is not capable of performing the writing process. When the power of the printer PR is in the ON state, the processor 32 performs the sending process using the electric power supplied from the power of the printer PR. On the other hand, when the power of the printer PR is in the OFF state, the processor 32 performs the sending process using the electromotive force caused by an inductive current generated between NFC I/F 30 and NFC I/F in the portable terminal. Thus, even when the power of the printer PR is in the OFF state, the processor 32 is capable of performing the sending process.

The SRAM 34 is a volatile memory and stores a prohibition flag PF. The prohibition flag PF is a flag showing whether sending of a response signal in response to the Polling signal is allowed or prohibited and shows a value "0" or "1". Specifically, the processor 32 sends a response signal to establish a communication session with the portable terminal when receiving the Polling signal from the portable terminal in the state of storing "0" as a value of the prohibition flag PF. That is, the processor 32 is capable of performing the sending process in the case of storing "0" as a value of the prohibition flag PF. The processor 32 does not send a response signal and thus does not establish a communication session with the portable terminal even when the Polling signal is received from the portable terminal in the state of storing "1" as a value for the prohibition flag PF. Accordingly, the target data SD is not sent to the portable terminal. That is, the processor 32 is not capable of performing the sending process in the case of storing "1" as the value of the prohibition flag PF. Since the SRAM 34 is a volatile memory, all of data showing "1" in the SRAM 34 is changed to "0" when the power of the printer PR is switched from the ON state to the OFF state. That is, a value of the prohibition flag PF is changed to "0".

NVRAM 36 is a nonvolatile memory and includes a header block HB and a data block DB. The header block HB is a block for storing header information and stores a writing flag WF, for example. The writing flag WF is used in second and third embodiments. The data block DB stores target data SD to be sent to a portable terminal.

The difference between the wireless LAN I/F 20 and the NFC I/F 30 is described below. The communication speed of the wireless communication via the wireless LAN I/F 20 (for example, the maximum communication speed of 11 to 600 Mbps) is higher than that of the wireless communication via the NFC I/F 30 (for example, the maximum communication speed of 100 to 424 Kbps). The frequency of carrier wave in the wireless communication via the wireless LAN I/F 20 (for example, 2.4 GHz band or 5.0 GHz band) is different from that in the wireless communication via NFC I/F 30 (for example, 13.56 MHz band). The maximum distance at which the wireless communication via the wireless LAN I/F 20 can be performed (for example, the maximum of about 100 m) is greater than that at which the wireless communication via the NFC I/F 30 can be performed (for example, the maximum of about 10 cm).

The controller 40 includes a CPU 42 and a memory 44. The CPU 42 is a processor that performs various processes in accordance with a program PG stored in the memory 44. The memory 44 is composed of a RAM, a ROM, and the like.

Configurations of Portable Terminals PT1 and PT2

Each of the portable terminals PT1 and PT2 is a transportable terminal unit such as a mobile phone (for example, a smart phone), a PDA, a notebook PC, a tablet PC, a portable music player, or a portable moving image reproducer. Each of the portable terminals PT1 and PT2 includes a wireless LAN I/F that is not shown in figures and is capable of performing Wi-Fi communication. Specifically, each of the portable terminals PT1 and PT2 supports the WFD scheme. Each of the portable terminals PT1 and PT2 further includes NFC I/F which is not shown in figures and is capable of performing NFC communication. The NFC I/F of each of the portable terminal PT1 and PT2 is an NFC Forum Device.

Figure 2:
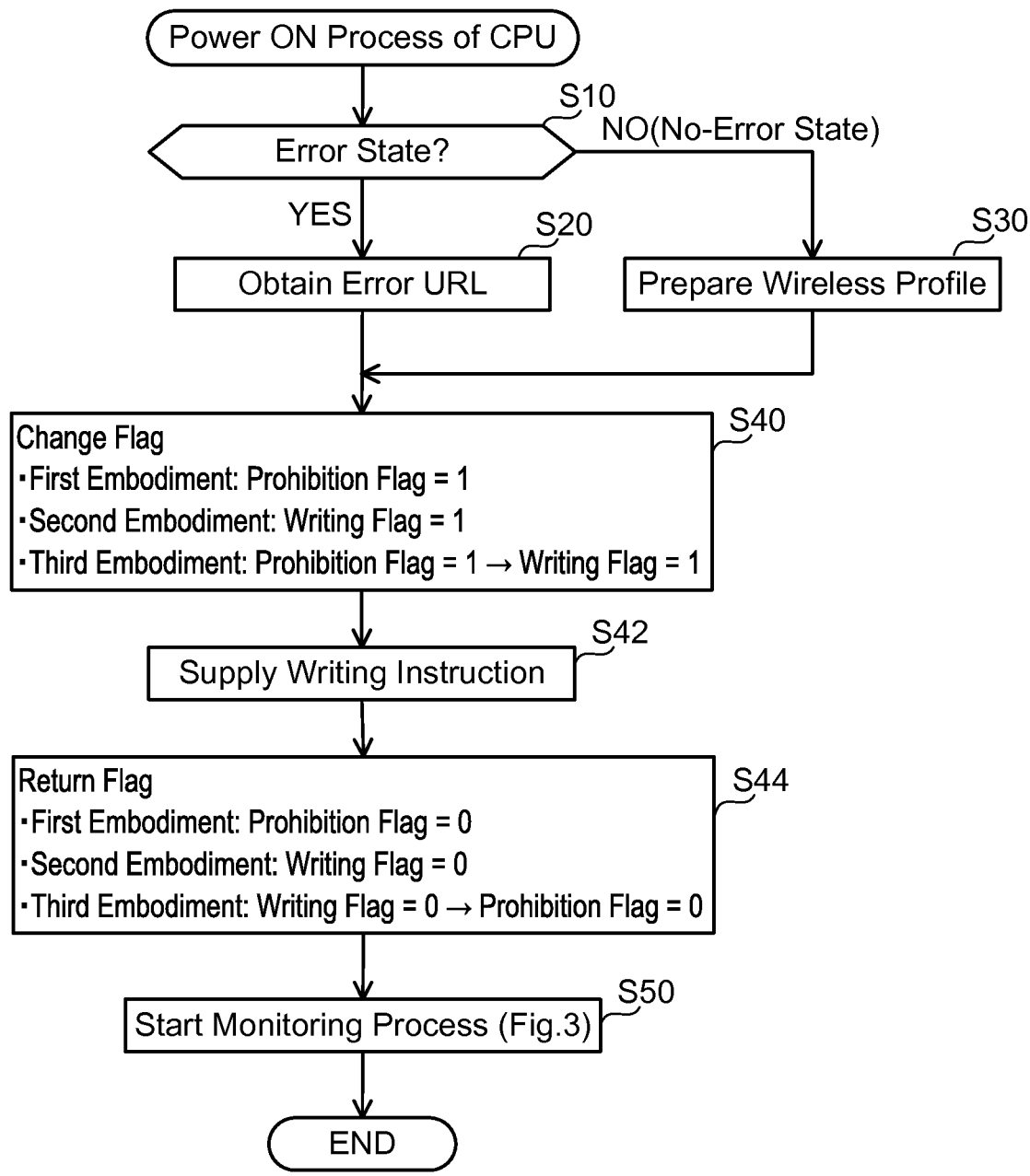
FIG. 2 shows a flowchart of a power ON process of CPU.

Power ON Process of CPU 42; FIG. 2

Subsequently, a power ON process performed by the CPU 42 of the controller 40 is described below with reference to FIG. 2. When the power button PB is operated by a user in the state in which the power of the printer PR is in the OFF state, the CPU 42 performs the power ON process.

In S10, the CPU 42 determines whether the printer PR is in an error state or a no-error state. The error state is a state in which the printer PR is not capable of performing a print function, and the no-error state is a state in which the printer PR is capable of performing a print function. Specifically, the CPU 42 obtains an output value of each error sensor that is not shown in figures. Examples of the error sensor include a sensor for detecting the remaining amounts of consumables (a toner, an ink, and the like) utilized in printing and a sensor for detecting the presence or absence of a paper jam. When the output value of any one of error sensors shows an error (for example, the remaining amount of consumables is zero, a paper jam is occurring, and the like), the CPU 42 determines that the printer PR is in the error state (YES in S10), and the process continues to S20. When the output values of all of error sensors do not show any error, the CPU 42 determines that the printer PR is in the no-error state (NO in S10), and the process continues to S30.

In S20, the CPU 42 obtains, from the memory 44, an error URL (abbreviation of Uniform Resource Locator) corresponding to the error currently generated in the printer PR. The memory 44 stores each error URL corresponding to each error in advance. Each error URL shows the location in a server (not shown in figures) installed on the Internet by a bender of the printer PR. The server stores a webpage showing a method for solving each error. Thus, for example, when the portable terminal receives an error URL from the printer PR and accesses a server in accordance with the error URL, the webpage can be displayed. Accordingly, the user of the portable terminal can solve the error currently generated in the printer PR. When S20 is terminated, the process continues to S40.

In S30, the CPU 42 prepares a wireless profile. The printer PR is operated in the Group Owner state (hereinafter referred to as the "G/O state") of the WFD scheme and forms a wireless network of the WFD scheme when receiving the Polling signal from the portable terminal. The wireless profile prepared in S30 is information that is to be used in the wireless network. That is, the wireless profile prepared in S30 is information that is to be used in a wireless network that may be formed by the printer PR in the future. Thus, for example, the portable terminal can join to the wireless network when receiving the wireless profile from the printer PR. Accordingly, for example, the portable terminal can send print data to the printer PR using the wireless network. The wireless profile prepared in S30 includes an SSID (abbreviation of service set identifier), an authentication scheme, a cryptography scheme, a password, and the like. The CPU 42 prepares an SSID and a password by randomly selecting a character string. The CPU 42 further prepares an authentication scheme and a cryptography scheme that are determined in advance. The CPU 42 causes the memory 44 to store the wireless profile. In this case, when the memory 44 has already stored an old wireless profile, the CPU 42 deletes the old wireless profile from the memory 44 and causes the memory 44 to store a new wireless profile prepared in S30. When S30 is terminated, the process continues to S40.

In S40, the CPU 42 changes the value of the prohibition flag PF in the SRAM 34 of the NFC I/F 30. At the time when the power of the printer PR is changed from the OFF state to the ON state, the value of the prohibition flag PF in the SRAM 34 shows "0". In S40, the CPU 42 supplies a PF changing instruction for storing "1" as a value of the prohibition flag PF in place of "0" in the SRAM 34 of the NFC I/F 30 to the NFC I/F30 (i.e., a processor 32). Thus, the processor 32 changes the value of the prohibition flag PF in the SRAM 34 from "0" to "1" (see YES in S110 of FIG. 4, S112). Accordingly, even when the Polling signal is received from the portable terminal, the response signal is not sent, and the session with the portable terminal is not established.

In S42, the CPU 42 performs a writing instruction supply process supplying a writing instruction to the NFC I/F 30. In S42 performed after S20, the CPU 42 supplies the writing instruction including the error URL obtained in S20 to the NFC I/F 30. In S42 performed after S30, the CPU 42 supplies the writing instruction including the wireless profile prepared in S30 to the NFC I/F 30. Thus, the processor 32 writes (i.e., stores) information (i.e., the error URL or the wireless profile) included in the writing instruction as a target data SD in the data block DB. When old target data SD had already been written in the data block DB, the processor 32 deletes the old target data SD from the data block DB and writes new target data SD in the data block DB.

In S44, the CPU 42 returns the value of the prohibition flag PF in the SRAM 34 to the original value in accordance with the completion of the writing instruction supply process. Specifically, the CPU 42 supplies a PF return instruction for storing "0" as a value of the prohibition flag PF in place of "1" in the SRAM 34 of the NFC I/F30 to the NFC I/F 30. Thus, the processor 32 changes the value of the prohibition flag PF in the SRAM 34 from "1" to "0" (see YES in S120 of FIG. 4, S122). Accordingly, when the Polling signal is received from the portable terminal, the response signal is sent, and the communication session with the portable terminal is established.

In S50, the CPU 42 starts a monitoring process (see FIG. 3 described below). When S50 is terminated, the process of FIG. 2 is terminated.

As mentioned above, after changing the value of the prohibition flag PF to "1" in S40, the writing instruction supply process is performed in S42. The reason of this is as follows. If the sending process for sending data in the data block DB from the NFC I/F30 to the portable terminal while the writing process is performed in accordance with the writing instruction in the NFC I/F 30, the following events may occur. That is, before all of the target data SD are written in the data block DB in accordance with the writing instruction, only a part of the target data SD (partial data that have been already written) may be sent to the portable terminal. In this case, the portable terminal cannot perform the process in accordance with the partial data and thus would result in obtaining unnecessary data. In order to avoid this, in the present embodiment, the writing instruction supply process is performed after having changed the value of the prohibition flag PF to "1", i.e., after the NFC I/F30 has transferred to the state of not being capable of performing the sending process. As described above, according to the present embodiment, the printer PR can inhibit incomplete data (i.e., unnecessary data) from being sent to the portable terminal.

Monitoring Process of CPU 42; FIG. 3

Subsequently, a monitoring process performed by the CPU 42 of the controller 40 is described below with reference to FIG. 3. The monitoring process is started in S50 of FIG. 2, and the monitoring steps S60, S70, S80, and S90 are performed in sequence.

In S60, the CPU 42 monitors whether the state of the printer PR is changed from the no-error state to the error state. Specifically, the CPU 42 determines YES in S60 when the state is changed from the state in which the output value of all of error sensors do not show any error to the state in which the output values of one or more error sensors show an error. In this case, in S62, the CPU 42 obtains an error URL corresponding to the error currently generated in the printer PR from the memory 44. S62 is the same as S20 in FIG. 2. When S62 is terminated, the process continues to S64.

In S70, the CPU 42 monitors whether the state of the printer PR is changed from the error state to the no-error state. Specifically, the CPU 42 determines YES in S70 when the state is changed from the state in which the output values of one or more error sensors show an error to the state in which the output values of all of the error sensors do not show any error. In this case, in S72, the CPU 42 prepares a wireless profile. The S72 is the same as S30 in FIG. 2. When S72 is terminated, the process continues to S64.

S64 to S68 are same as S40 to S44 in FIG. 2. Thus, the printer PR can inhibit the incomplete data from being sent to the portable terminal. When S68 is terminated, the process returns to S60.

In S80, the CPU 42 monitors whether a specific connecting request is received from the portable terminal via the wireless LAN I/F 20. The specific connecting request is a Probe Request and includes an SSID in a wireless profile currently stored in the memory 44 (hereinafter referred to as a "current wireless profile"), i.e., an SSID in the current wireless profile prepared in S30 of FIG. 2 or S72 of FIG. 3. As mentioned above, when the Polling signal is received from the portable terminal, the state of the printer PR transfers to the G/O state. The specific connecting request is a request received when the printer PR is in the G/O state. When the specific connecting request is received from the portable terminal, the CPU 42 determines YES in S80, and the process continues to S82.

In S82, the CPU 42 supplies the PF changing instruction to the NFC I/F 30. S82 is the same as S40 in FIG. 2.

In S83, the CPU 42 performs a connecting process for establishing a wireless connection with the portable terminal that is the source of the specific connecting request in S80 (hereinafter referred to as the "target portable terminal"). Specifically, the CPU 42 sends a response signal (i.e., a Probe Response) in response to the specific connecting request to the target portable terminal. The CPU 42 further performs communication such as a Provision Discovery Request/Response, an Association Request/Response, an Authentication Request/Response, and a 4-Way Handshake via the wireless LAN OF 20. In this stage, each piece of information (for example, an authentication scheme, a cryptography scheme, a password, and the like) included in the current wireless profile is sent from the target portable terminal to the printer PR, and the printer PR performs authentication of the target portable terminal using each piece of information. When the authentication of the target portable terminal succeeds, the printer PR establishes the wireless connection with the target portable terminal via the wireless LAN I/F 20 and forms a wireless network (hereinafter referred to as a "target wireless network") of the WFD scheme using the current wireless profile. The target wireless network is a wireless network in which the printer PR is operated in the G/O state of the WFD scheme, and the target portable terminal is operated in the client state of the WFD scheme.

In S84, the CPU 42 supplies the PF return instruction to the NFC I/F 30. S84 is the same as S44 in FIG. 2.

In S85, the CPU 42 performs a print process. Specifically, the CPU 42 receives print data representing a print-target image from the target portable terminal via the wireless LAN I/F 20 utilizing the target wireless network. Then, the CPU 42 supplies the print data to the print performing unit 16 and causes the print performing unit 16 to perform printing of the image.

The print data is an image file or the like, and thus, the data size thereof is relatively large. Furthermore, the communication speed of the NFC communication is lower than that of the Wi-Fi communication. Thus, if a configuration in which wireless communication of the print data is performed in accordance with the NFC communication between the printer PR and the target portable terminal is employed, the printer PR takes a long time to receive the print data. In contrast, in the present embodiment, wireless communication of the print data is performed in accordance with the Wi-Fi communication between the printer PR and the target portable terminal. Thus, the printer PR can promptly receive the print data.

In S86, in response to the completion of the print process, the CPU 42 cause the operating state of the printer PR to transfer from the G/O state to the device state. In this case, the device state is the state in which the printer PR does not operate in the G/O state or the client state, and the printer PR does not belong to the wireless network. When the state of the printer PR transfers from the G/O state to the device state, the target wireless network is disappeared, and the wireless connection between the printer PR and the target portable terminal is disconnected. When S86 is terminated, the process continues to S60.

As mentioned above, the value of the prohibition flag PF is changed to "1" in S82, and thereafter, the connecting process is performed in S83. The reason of this is as follows. The number of portable terminals that can join the target wireless network (hereinafter referred to as the "upper limit number") has been already determined and is "1" in the present embodiment. For example, when the target data SD that is the current wireless profile is sent from the NFC I/F 30 to a portable terminal PT2 while the printer PR performs the connecting process with the portable terminal PT1 is performed, the following event may occur. That is, while the connecting process with the portable terminal PT1 is performed, a specific connecting request may be received from the portable terminal PT2. In this case, the connecting process with the portable terminal PT2 may be performed before the establishment of the wireless connection with the portable terminal PT1, and the wireless connection with the portable terminal PT2 may be established. That is, even if the current wireless profile is sent to the portable terminal PT1 in first among the two portable terminals PT1 and PT2, the wireless connection with the portable terminal PT2 may be established. In this case, since the upper limit number is "1", the portable terminal PT1 cannot join the target wireless network. In order to avoid this, in the present embodiment, the connecting process is performed after the change of the value of the prohibition flag PF to "1", i.e., after the NFC I/F30 has transferred to the state of not being capable of performing the sending process. Accordingly, in the above-described embodiment, the event where the current wireless profile is sent to the portable terminal PT2 while the connecting process with the portable terminal PT1 is performed does not occur, and thus, the wireless connection with the portable terminal PT1 is appropriately established. As described above, the printer PR can prevent the occurrence of the event where the portable terminal that receives the current wireless profile cannot join the target wireless network.

In S90, the CPU 42 monitors whether the power button PB (see FIG. 1) of the operation unit 12 is operated. When the power button PB is operated, the CPU 42 determines YES in S90, and the process continues to S92.

In S92, the CPU 42 supplies the PF changing instruction to the NFC I/F 30. S92 is the same as S40 in FIG. 2.

In S94, the CPU 42 performs a power OFF process. Specifically, for example, the CPU 42 performs maintenance of the print performing unit 16 (for example, a cap of a head surface of ink jet head) and performs deletion of unnecessary data in the memory 44. When the printer PR is in the no-error state, i.e., the NFC I/F 30 stores the current wireless profile as the target data SD, the CPU 42 performs a writing instruction supply process of supplying a writing instruction including OFF information showing that the power of the printer PR is in the OFF state to the NFC I/F 30. Thus, the processor 32 writes (i.e., stores), in the data block DB, the OFF information included in the writing instruction as new target data SD in place of the old target data SD (i.e., the current wireless profile). For example, when the OFF information is received from the printer PR, the portable terminal can display the OFF information. Accordingly, the user of the portable terminal can know that the power of the printer PR is in the OFF state.

Figure 3:
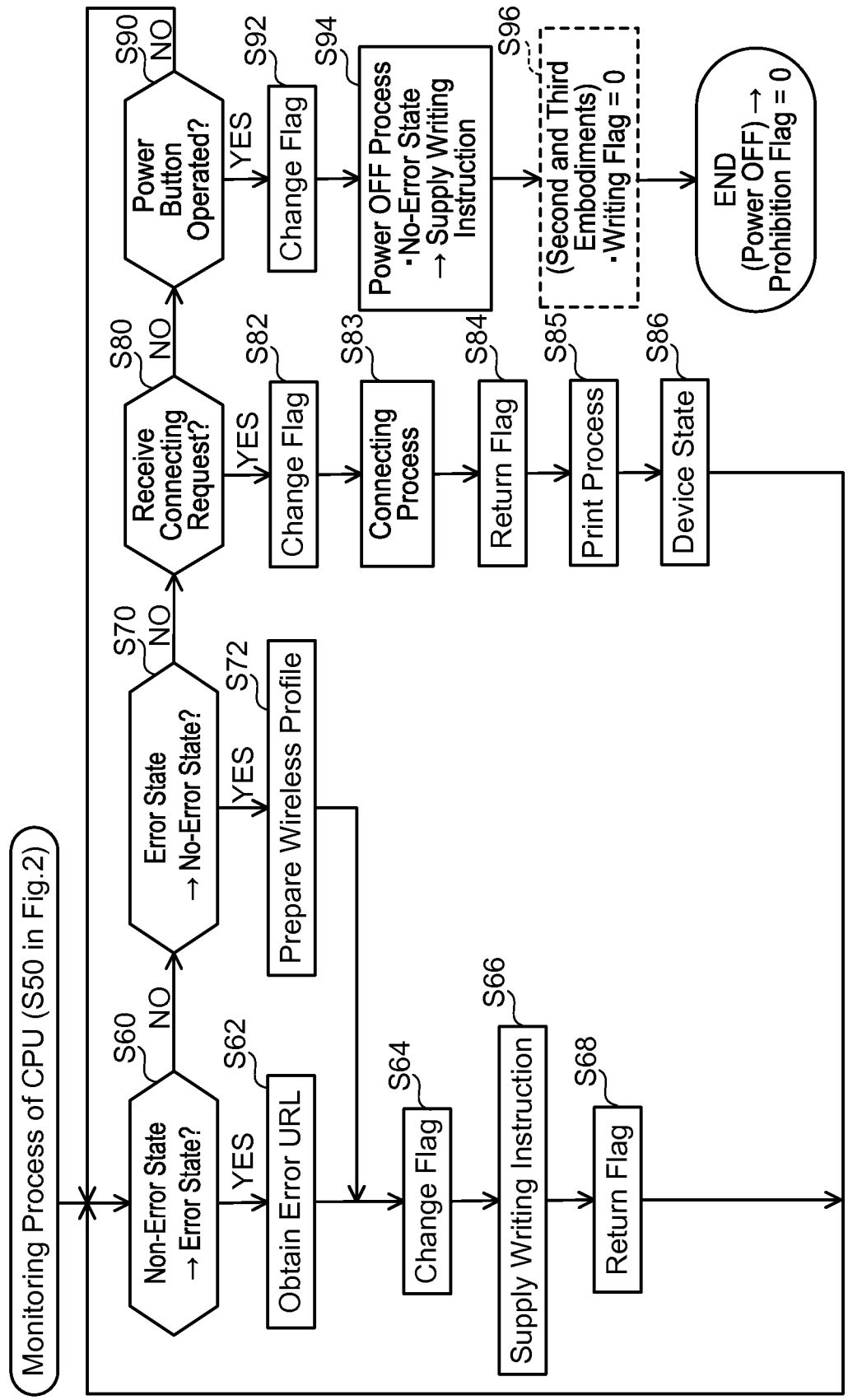
FIG. 3 shows a flowchart of a monitoring process of CPU.

When S94 is terminated, the CPU 42 switches the power of the printer PR from the ON state to the OFF state so as to terminate the process of FIG. 3. The value of the prohibition flag PF in the SRAM 34 of the NFC I/F 30 is "1" in the stage immediately before the termination of the process of FIG. 3 (see S92). However, since the power of the printer PR is in the OFF state, the value of the prohibition flag PF in the SRAM 34 which is a volatile memory is changed to "0". It should be noted that in the modifications, the CPU 42 can supply the PF return instruction to the NFC I/F 30 after the termination of S94.

As mentioned above, the value of the prohibition flag PF is changed to "1" in S92, and thereafter, the power OFF process is performed in S94. The reason of this is as follows. Even if the current wireless profile in the data block DB is sent from the NFC I/F 30 to the portable terminal while the power OFF process is performed, the portable terminal cannot establish a wireless connection with the printer PR using the current wireless profile (i.e., the portable terminal cannot join the target wireless network). This is because the power of the printer PR is switched to be in the OFF state when the power OFF process is terminated. In order to avoid this, in the present embodiment, the power OFF process is performed after the change of the value of the prohibition flag PF to "1", i.e., after the NFC I/F30 has transferred to the state of not being capable of performing the sending process. Thus, the event where the current wireless profile is sent to the portable terminal while the power OFF process is performed does not occur. As described above, according to the present embodiment, the printer PR can prevent the occurrence of the event where the portable terminal that receives the current wireless profile cannot join the target wireless network. Moreover, in the power OFF process, a writing instruction supply process may be performed. Thus, the writing instruction supply process may be performed after the change of the value of the prohibition flag PF to "1", so that incomplete data is not sent to the portable terminal.

Figure 4:
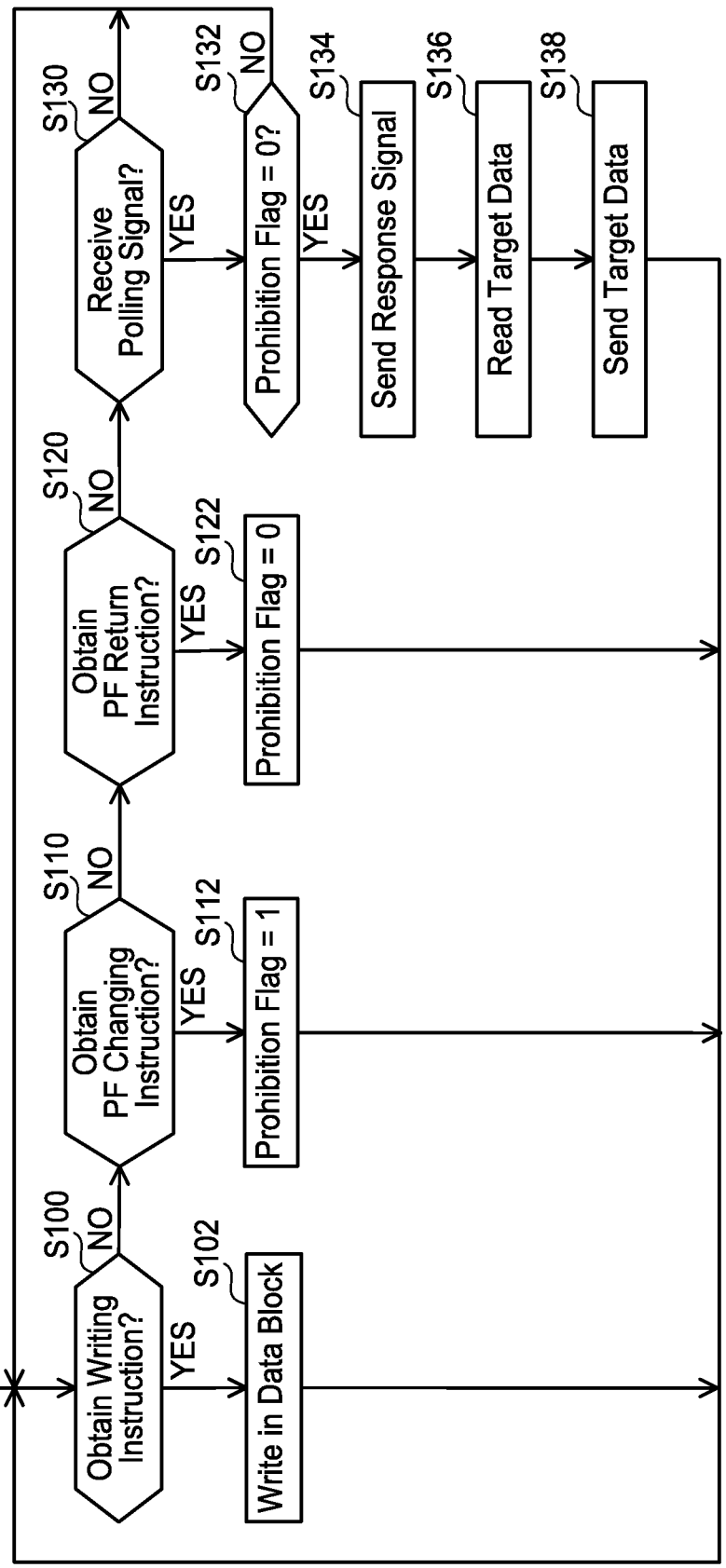
FIG. 4 shows a flowchart of a process of a processor in an NFC interface.

Process of Processor 32; FIG. 4

Subsequently, the process performed by the processor 32 of the NFC I/F 30 is described below with reference to FIG. 4. In the process of FIG. 4, the monitoring steps S100, S110, S120, and S130 are performed in sequence.

In S100, the processor 32 monitors whether or not a writing instruction (see S42 in FIGS. 2, S66 and S94 in FIG. 3) is obtained from a controller 40 (i.e., a CPU 42). When the writing instruction is obtained from the controller 40, the processor 32 determines YES in S100. In this case, in S102, the processor 32 performs a writing process of writing, in a data block DB of the NVRAM 36, new target data SD in the writing instruction obtained in S100 in place of old target data SD. When S102 is terminated, the process returns to S100.

In S110, the processor 32 monitors whether or not a PF changing instruction (see S40 in FIGS. 2 and S64, S82, and S92 in FIG. 3) is obtained from the controller 40. When the PF changing instruction is obtained from the controller 40, the processor 32 determines YES in S110. In this case, in S112, the processor 32 changes the value of the prohibition flag PF in SRAM 34 from "0" to "1". When S112 is terminated, the process returns to S100.

In S120, the processor 32 monitors whether or not the PF return instruction (S44 in FIG. 2 and S68 and S84 in FIG. 3) is obtained from the controller 40. When the PF return instruction is obtained from the controller 40, the processor 32 determines YES in S120. In this case, in S122, the processor 32 changes the value of the prohibition flag PF in the SRAM 34 from "1" to "0". When S122 is terminated, the process returns to S100.

In S130, the processor 32 monitors whether or not a Polling signal that is a request signal for establishing a communication session from the portable terminal is received. When the distance between the NFC I/F30 of the printer PR and the NFC I/F of the portable terminal becomes a predetermined distance (for example, 10 cm) or less, the processor 32 receives the Polling signal from the portable terminal and determines YES in S130, and then, the process continues to S132. Although not shown in the figure, the processor 32 supplies a predetermined notification to the controller 40 when it receives the Polling signal from the portable terminal. In this case, the CPU 42 of the controller 40 cause the operating state of the printer PR to transfer from the device state to the G/O state when the operating state of the printer PR is the device state of the WFD scheme.

In S132, the processor 32 determines whether or not the value of the prohibition flag PF in the SRAM 34 is "0". When the processor 32 determines that the value of the prohibition flag PF is "0" (YES in S132), the process continues to S134, and when the processor 32 determines that the value of the prohibition flag PF is "1" (NO in S132), the processor 32 does not perform S134 to S138, and the process returns to S100.

In S134, the processor 32 sends, to the portable terminal, a response signal in response to the Polling signal. Thus, the communication session between the NFC I/F 30 of the printer PR and the NFC I/F of the portable terminal is established. In S136, the processor 32 reads the target data SD from the data block DB in the NVRAM 36. Then, in S138, the processor 32 sends the target data SD to the portable terminal using the communication session established in S134. When S138 is terminated, the process returns to S100.

The instructions in S100, S110, and S120 are supplied from the controller 40 while the power of the printer PR is in the ON state, and they are not supplied from the controller 40 while the power of the printer PR is in the OFF state. Thus, processes of S102, S112, and S122 are not performed when the power of the printer PR is in the OFF state. On the other hand, the processes of S130 to S138 are performed even when the power of the printer PR is in the ON state, and they are performed using an electromotive force caused by an inductive current even when the power of the printer is in the OFF state. That is, the processor 32 is capable of performing sending processes of S134 to S138 regardless of whether the power of the printer PR is in the ON state or the OFF state.

Figure 5:
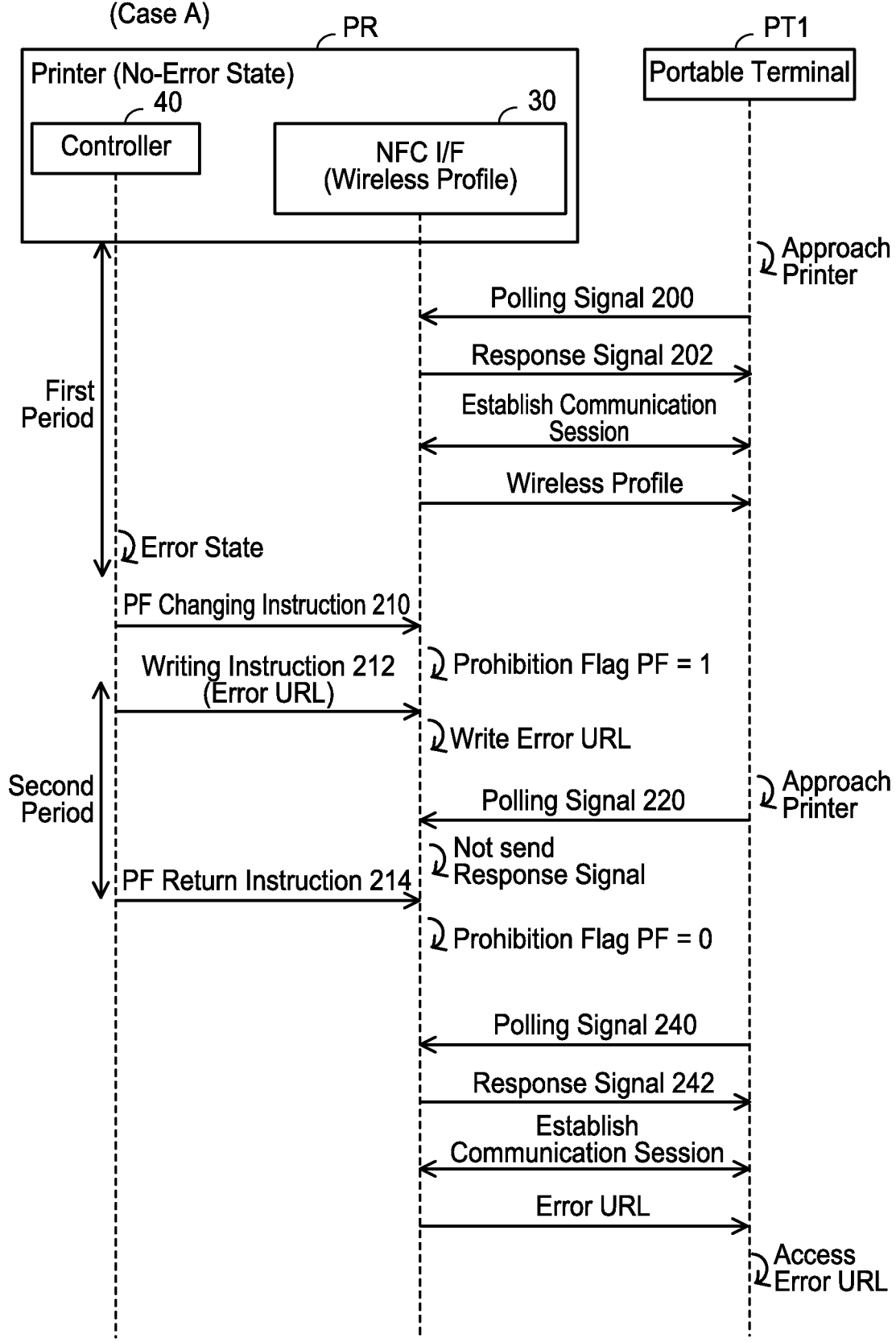
FIG. 5 shows a sequence diagram of case A in which a writing instruction is supplied.

Case A; FIG. 5

Subsequently, specific cases A to C achieved by the flowcharts of FIGS. 2 to 4 are described below with reference to FIGS. 5 to 7. In the initial state of the case A in FIG. 5, the printer PR is in the no-error state. Thus, the data block DB of the NFC I/F 30 stores a wireless profile as target data SD (S30 and S42 of FIGS. 2, S72 and S66 of FIG. 3).

The user of the portable terminal PT1 brings the portable terminal PT1 to approach the printer PR. Thus, the distance between the NFC I/F 30 of the printer PR and the NFC I/F of the portable terminal PT1 becomes a predetermined distance (for example, 10 cm) or less, and thus, the NFC I/F 30 of the printer PR receives a Polling signal 200 from the portable terminal PT1 (YES in S130 of FIG. 4) and sends a response signal 202 to the portable terminal PT1 (YES in S132, S134). Accordingly, the communication session is established. Subsequently, the NFC I/F 30 sends the wireless profile that is the target data SD to the portable terminal PT1 using the communication session.

Although not shown in the figure, the printer PR causes the operating state of the printer PR to transfer from the device state to the G/O state when the operating state of the printer PR is in the device state at the time of receiving the Polling signal 200 from the portable terminal PT1. This point applies to the case where each Polling signal is received (numerals 220 and 240 of FIG. 5, the numerals 300 and 320 of FIG. 6, and the like) described below. The printer PR establishes the wireless connection with the portable terminal PT1 and forms a target wireless network (S83) when a specific connecting request is received from the portable terminal PT1 at the time when the printer PR is operated in the G/O state (YES in S80 of FIG. 3). When the printer PR does not receive the specific connecting request from the portable terminal PT1 even after the predetermined time has passed from the transfer of the operating state of the printer PR to the G/O state, the operating state of the printer PR is returned from the G/O state to the device state.

The printer PR transfers from the no-error state to the error state during the first period in which the writing instruction supply process is not being performed (YES in S60 of FIG. 3). In this case, the controller 40 of the printer PR supplies the PF changing instruction 210 to the NFC I/F 30 (S64). Accordingly, the value of the prohibition flag PF is changed from "0" to "1" in the NFC I/F 30 (YES in S110 of FIG. 4, S112). Then, the controller 40 performs the writing instruction supply process of supplying the writing instruction 212 including an error URL to the NFC I/F 30 during the second period in which the value of the prohibition flag PF is "1" (S66). Accordingly, the error URL is written in the NFC I/F 30 as the target data SD in place of the wireless profile.

Before the writing instruction supply process of the controller 40 is completed, i.e., before the writing of the error URL in the NFC I/F 30 is completed, the user of the portable terminal PT1 again brings the portable terminal PT1 to approach the printer PR. Thus, the NFC I/F 30 of the printer PR receives a Polling signal 220 from the portable terminal PT1 (YES in S130 of FIG. 4). It should be noted that since the value of the prohibition flag PF is "1", the NFC I/F 30 does not send the response signal to the portable terminal PT1 (NO in S132). Accordingly, the communication session is not established, and the data in the NFC I/F 30 is not sent to the portable terminal PT1.

In response to the completion of the writing instruction supply process, the controller 40 of the printer PR supplies a PF return instruction 214 to the NFC I/F 30 (S68 of FIG. 3). Accordingly, in the NFC I/F 30, the value of the prohibition flag PF is changed from "1" to "0" (YES in S120 of FIG. 4, S122).

Thereafter, the user of the portable terminal PT1 again brings the portable terminal PT1 to approach the printer PR. Thus, the NFC I/F 30 of the printer PR receives a Polling signal 240 from the portable terminal PT1 (YES in S130 of FIG. 4) and sends a response signal 242 to the portable terminal PT1 (YES in S132, S134). Accordingly, the communication session is established. Then, the NFC I/F 30 sends an error URL that is the target data SD to the portable terminal PT1 using the communication session.

The portable terminal PT1 accesses the error URL to display a webpage showing a method for solving the error currently generated in the printer PR. Thus, the user can solve the error of the printer PR.

In the case A, the printer PR can inhibit the data in the NFC I/F 30 from being sent to the portable terminal PT1 while the writing instruction supply process for writing the error URL in the NVRAM 36 of the NFC I/F 30 is performed. Thus, the printer PR can inhibit incomplete data from being sent to the portable terminal PT1.

Case B; FIG. 6

Figure 6:
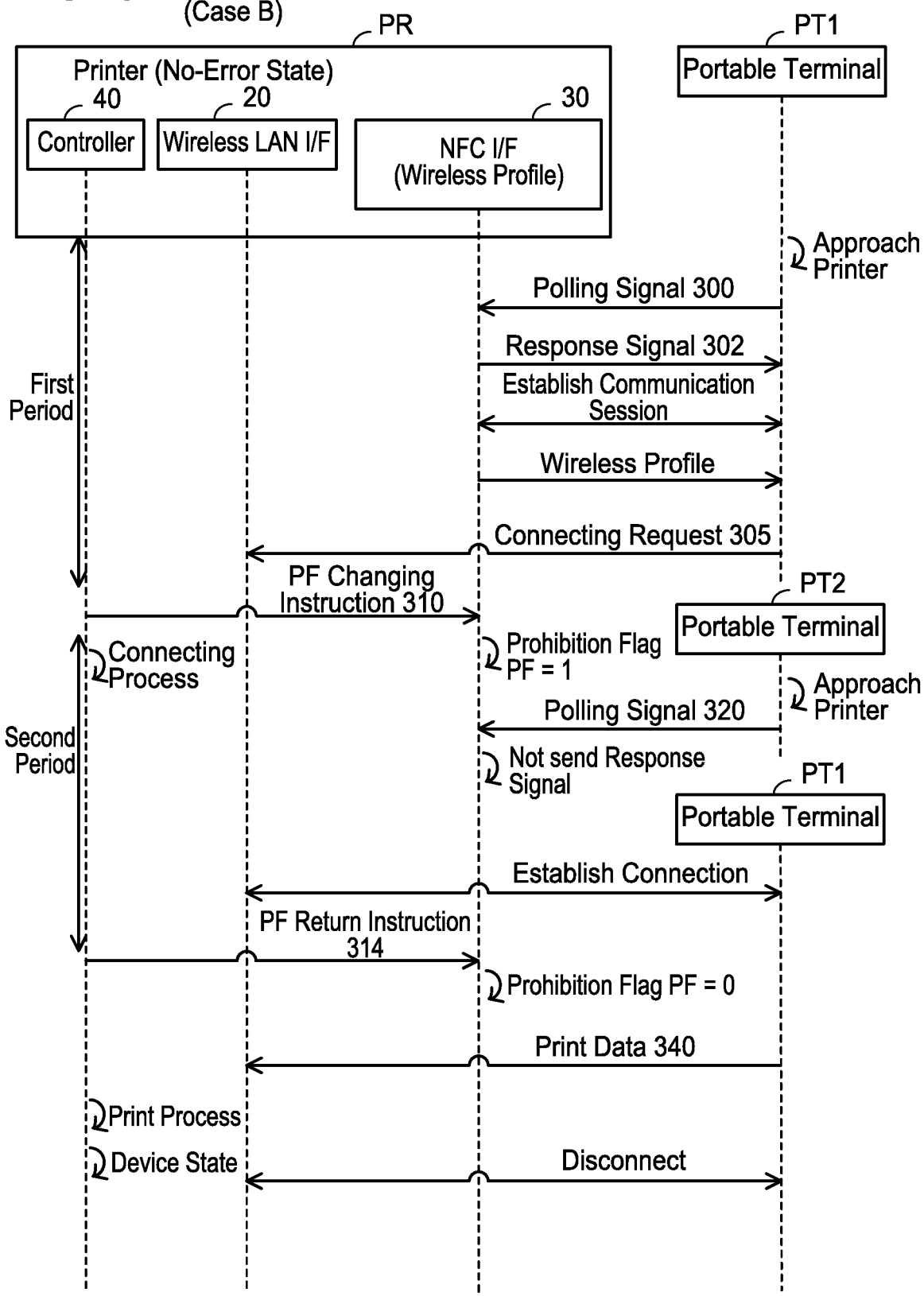
FIG. 6 shows a sequence diagram of case B in which a connecting process is performed.

The initial state of the case B in FIG. 6 is the same as that of the case A in FIG. 5, the printer PR is in the no-error state, and the data block DB of the NFC I/F 30 stores a wireless profile. The point where the communication of signals 300 and 302 is performed, and the wireless profile is sent to the portable terminal PT1 is the same as the case A of FIG. 5.

The controller 40 of the printer PR receives a specific connecting request 305 including an SSID in the wireless profile from the portable terminal PT1 via the wireless LAN I/F 20 during the first period in which the connecting process is not being performed (YES in S80 of FIG. 3). Subsequently, the controller 40 supplies a PF changing instruction 310 to the NFC I/F 30 (S82) to change the value of the prohibition flag PF to "1" (YES in S110 of FIG. 4, S112). Then, the controller 40 performs the connecting process for establishing a wireless connection with the portable terminal PT1 during the second period in which the value of the prohibition flag PF is "1".

Before the connecting process of the controller 40 is completed, i.e., before the wireless connection with the portable terminal PT1 is established, the user of the portable terminal PT2 that is different from the portable terminal PT1 brings the portable terminal PT2 to approach the printer PR. Thus, the NFC I/F 30 of the printer PR receives a Polling signal 320 from the portable terminal PT2 (YES in S130 of FIG. 4). It should be noted that since the value of the prohibition flag PF is "1", the NFC I/F 30 does not send the response signal to the portable terminal PT2 (NO in S132). Accordingly, the communication session is not established, and the wireless profile in the NFC I/F30 is not sent to the portable terminal PT2.

In response to the completion of the connecting process, i.e., the establishment of the wireless connection with the portable terminal PT1, the controller 40 of the printer PR supplies a PF return instruction 314 to the NFC I/F 30 (S84 of FIG. 3) to change the value of prohibition flag PF to "0" (YES in S120 of FIG. 4, S122). Subsequently, the controller 40 receives print data 340 from the portable terminal PT1 via the wireless LAN IF 20 using the target wireless network and performs a print process (S85 of FIG. 3). Then, the controller 40 causes the operating state of the printer PR to transfer from the G/O state to the device state and causes the target wireless network to disappear (S86). Accordingly, the wireless connection between the printer PR and the portable terminal PT1 is disconnected (S86).

In the case B, the printer PR can inhibit the wireless profile in the NFC I/F 30 from being sent to the portable terminal PT2 while the connecting process for establishing the wireless connection with the portable terminal PT1 is performed. Thus, the printer PR can prevent the occurrence of the event where the portable terminal PT1 that receives the wireless profile cannot join the target wireless network.

Case C; FIG. 7

Figure 7:
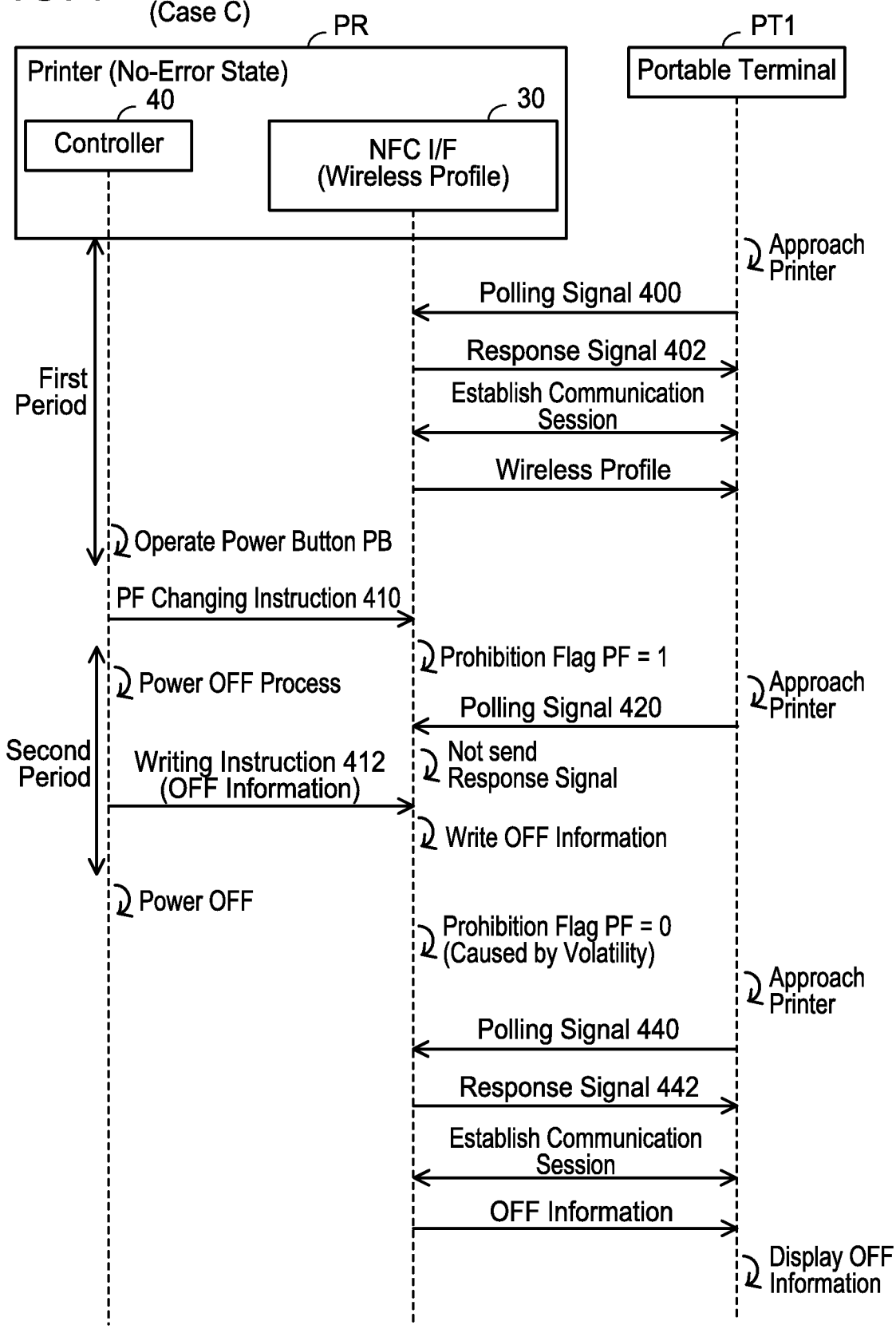
FIG. 7 shows a sequence diagram of case C in which a power OFF process is performed.

The initial state of the case C in FIG. 7 is the same as that of the case A of FIG. 5, the printer PR is in the no-error state, and the data block DB of the NFC I/F 30 stores a wireless profile. The point where the communication of the signals 400 and 402 is performed, and the wireless profile is sent to the portable terminal PT1 is the same as the case A of FIG. 5.

The power button PB of the printer PR is operated by a user during the first period in which a power OFF process is not being performed (YES in S90 of FIG. 3). In this case, the controller 40 of the printer PR supplies a PF changing instruction 410 to the NFC I/F 30 (S92) to change the value of the prohibition flag PF to "1" (YES in S110 of FIG. 4, S112). Then, the controller 40 performs the power OFF process during the second period in which the value of the prohibition flag PF is "1" (S94).

Before the power OFF process of the controller 40 is completed, the user of the portable terminal PT1 again brings the portable terminal PT1 to be close the printer PR. Thus, the NFC I/F 30 of the printer PR receives a Polling signal 420 from the portable terminal PT1 (YES in S130 of FIG. 4). It should be noted that since the value of the prohibition flag PF is "1", the NFC I/F 30 does not send the response signal to the portable terminal PT1 (NO in S132). Accordingly, the communication session is not established, and the wireless profile in the NFC I/F 30 is not sent to the portable terminal PT1.

In the course of performing the power OFF process, the controller 40 of the printer PR performs a writing instruction supply process of supplying a writing instruction 412 including OFF information to the NFC I/F 30 (S94). Accordingly, the OFF information is written in the NFC I/F 30 as the target data SD in place of the wireless profile (YES in S100 of FIG. 4, S102). In response to the completion of the power OFF process, the controller 40 switches the power of the printer PR from the ON state to the OFF state (termination of the process in FIG. 3). Accordingly, the value of the prohibition flag PF is changed to "0" in the NFC I/F 30 due to being volatile.

Thereafter, the user of the portable terminal PT1 again brings the portable terminal PT1 to approach the printer PR. Thus, the NFC I/F 30 of the printer PR receives a Polling signal 440 from the portable terminal PT1 (YES in S130 of FIG. 4) and sends a response signal 442 to the portable terminal PT1 (YES in S132, S134). Accordingly, the communication session is established. Then, the NFC I/F 30 sends the OFF information that is the target data SD to the portable terminal PT1 using the communication session.

The portable terminal PT1 displays the OFF information. Thus, the user can know that the power of the printer PR is in the OFF state.

In the case C, the printer PR can inhibit the wireless profile in the NFC I/F 30 from being sent to the portable terminal PT1 while the power OFF process is performed. Thus, the printer PR can prevent the occurrence of the event where the portable terminal PT1 that receives the wireless profile cannot join the target wireless network. Moreover, the OFF information is written in the NFC I/F 30 in place of the wireless profile before switching the power of the printer PR to be in the OFF state. Thus, when the power of the printer PR is in the OFF state, the wireless profile is not sent to the portable terminal PT1, and instead the OFF information is sent to the portable terminal PT1. Also in this regard, the printer PR can prevent the occurrence of the event where the portable terminal PT1 that receives the wireless profile cannot join the target wireless network.

If the printer is in the error state, i.e., an error URL is written in the NFC I/F 30, the written instruction including the OFF information is not supplied to the NFC I/F 30 in the power OFF process (S94 of FIG. 3). Thus, when the power of the printer PR is in the OFF state, the error URL is sent to the portable terminal PT1. Therefore, the portable terminal PT1 accesses the error URL to display a webpage. Accordingly, even when the power of the printer PR is in the OFF state, the user can know that the printer PR is in the error state and can solve the error of the printer PR.

Effect of the First Embodiment

As shown in the cases A to C of FIGS. 5 to 7, in the present embodiment, when a writing instruction supply process, a connecting process, or a power OFF process is performed in the printer PR, i.e., data in the NFC I/F 30 is not to be sent to a portable terminal, the data is not sent to the portable terminal. Thus, incomplete data is not sent to the portable terminal (Case A of FIG. 5), and the occurrence of the event where the portable terminal that receives the wireless profile cannot join a target wireless network can be prevented (Cases B and C in FIGS. 6 and 7). Moreover, when the processes are not performed, the target data SD is sent to the portable terminal. Thus, the printer PR can send the target data SD in the NFC I/F 30 to the portable terminal in an appropriate situation.

Correspondence Relationship

The printer PR is an example of the "communication apparatus", and each of the portable terminals PT1 and PT2 is an example of the "external apparatus". The NFC I/F 30 and the wireless LAN I/F 20 are examples of the "first wireless interface" and "second wireless interface", respectively. The NVRAM 36 and the SRAM 34 are examples of the "first memory" and "second memory", respectively. The state in which the value of the prohibition flag PF is "0" and the state in which the value of the prohibition flag PF is "1" are examples of the "first state" and "second state", respectively. The value of the prohibition flag PF of "1" and the value of the prohibition flag PF of "0" are examples of the "first value" and "second value", respectively. The PF changing instruction and the PF return instruction are examples of the "first storing instruction" and "first deleting instruction", respectively.

Each of the writing instruction supply process in S42 in FIG. 2, the writing instruction supply process in S66 of FIG. 3, the connecting process in S83 of FIG. 3, and the power OFF process in S94 of FIG. 3 is an example of the "predetermined process".

Second Embodiment

The difference of the second embodiment from the first embodiment is described below. In the present embodiment, in the NFC I/F 30, the prohibition flag PF in the SRAM 34 is not used, and the writing flag WF (see FIG. 1) in the header block HB of the NVRAM 36 is used.

The writing flag WF is a flag indicating whether the state is a non-writing state in which writing of data in a data block DB is not performed or an in-writing state in which writing of data in a data block DB is performed, and the value "0" indicates the non-writing state, and the value "1" indicates the in-writing state. The processor 32 reads target data SD from the data block DB and sends the target data SD to a portable terminal when a communication session with the portable terminal is established in the state in which "0" is stored as a value of the writing flag WF (i.e., the non-writing state). That is, when the value "0" is stored as the writing flag WF, the processor 32 is capable of performing a sending process. On the other hand, the processor 32 does not read the target data SD from the data block DB and sends an empty packet including no data to the portable terminal when the communication session with the portable terminal is established in the state in which the value "1" is stored as the writing flag WF (i.e., the in-writing state). That is, the processor 32 is not capable of performing the sending process when the value "1" is stored as the writing flag WF. Although it is specifically described below, in the present embodiment, "1" may be stored as a value of the writing flag WF even in the state in which the writing process is not performed. That is, in the present embodiment, "1" may be stored as a value of the writing flag WF in order to prohibit the performing of the sending process by the processor 32.

Process of CPU 42; FIGS. 2 and 3

The present embodiment is different from the first embodiment in S40 and S44 of FIG. 2. In S40, the CPU 42 supplies, to the NFC I/F 30, a WF changing instruction for storing "1" in the header block HB of the NVRAM 36 as a value of the writing flag WF in place of "0". Thus, the processor 32 changes the value of the writing flag WF in the header block HB from "0" to "1" (see YES in S110A of FIG. 8, S112A). Moreover, in S44, the CPU 42 supplies, to the NFC I/F 30, a WF return instruction for storing "0" in the header block HB of the NVRAM 36 as a value of the writing flag WF in place of "1". Thus, the processor 32 changes the value of the writing flag WF in the header block HB from "1" to "0" (see S120A of FIG. 8, S122A).

In the present embodiment, the CPU 42 supplies the WF changing instruction to the NFC I/F 30 in S64, S82, and S92 of FIG. 3. Although the writing instruction supply process is not performed in the connecting process of S83, "1" is stored as a value of the writing flag WF in S82. When the printer PR is in the error state, the writing instruction supply process is not performed in the power OFF process of S94, and "1" is stored as a value of the writing flag WF in S92.

In S68 and S84 of FIG. 3, the CPU 42 supplies the WF return instruction to the NFC I/F 30. After the termination of the power OFF process in S94, the CPU 42 further supplies the WF return instruction to the NFC I/F 30 in S96. The reason of this is as follows. That is, the writing flag WF is stored in the NVRAM 36 that is a nonvolatile memory. Thus, the value of the writing flag WF is not changed from "1" to "0" due to the switching of the power of the printer PR to the OFF state. Therefore, in the present embodiment, the process of S96 is performed before the switching of the power of the printer PR to the OFF state in order to change the value of the writing flag WF to "0".

Figure 8:
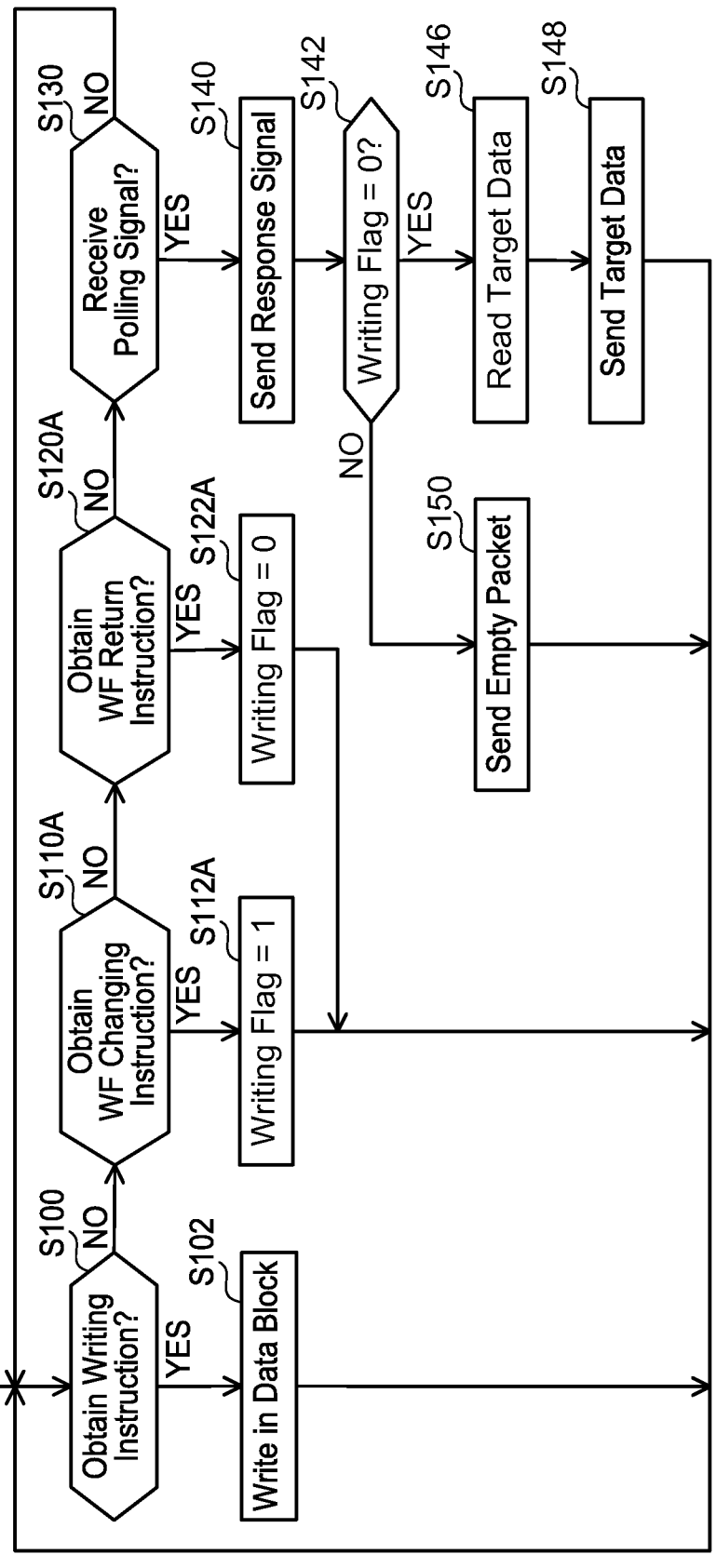
FIG. 8 shows a flowchart of a process of a processor in an NFC interface according to the second embodiment.

Process of Processor 32; FIG. 8

The processor 32 of the NFC I/F 30 performs a process of FIG. 8 in place of the process of FIG. 4. S100 and S102 of FIG. 8 are the same as those of FIG. 4. When the WF changing instruction is obtained from the controller 40, the processor 32 determines YES in S 110A and changes the value of the writing flag WF from "0" to "1" in S112A. When the WF return instruction is obtained from the controller 40, the processor 32 determines YES in S120A and changes the value of the writing flag WF from "1" to "0" in S122A.

When the Polling signal is received from the portable terminal, the processor 32 determines YES in S130 and sends a response signal to the portable terminal in S140. That is, since the prohibition flag PF is not used in the present embodiment, the response signal is necessarily sent (i.e., a communication session is necessarily established) when the Polling signal is received from the portable terminal.

In S142, the processor 32 determines whether or not the value of the writing flag WF is "0". When the processor 32 determines that the value of the writing flag WF is "0" (YES in S142), it performs S146 and S148. S146 and S148 are the same as S136 and S138 of FIG. 4. On the other hand, when the processor 32 determines that the value of the writing flag WF is "1" (NO in S142), it does not read the target data SD from the data block DB and sends an empty packet including no data to the portable terminal. As in the first embodiment, the processor 32 is capable of performing the processes of S130 to S150 regardless of whether the power of the printer PR is in the ON state or the OFF state.

Case D; FIG. 9

Subsequently, the specific case D achieved by the present embodiment is described below with reference to FIG. 9. In the initial state of the case D of FIG. 9, the printer PR is in the no-error state, and the wireless profile is stored in the data block DB of the NFC I/F 30. The point where communication of signals 500 and 502 is performed, and a wireless profile is sent to a portable terminal PT1 is the same as in the case A of FIG. 5.

The printer PR transfers from the no-error state to the error state during the first period in which the wiring instruction supply process is not being performed (YES in S60 of FIG. 3). In this case, the controller 40 of the printer PR supplies a WF changing instruction 510 to the NFC I/F 30 (S64) to change the value of the writing flag WF to "1" (YES in S110A of FIG. 8 and S112A). Then, the controller 40 performs the writing instruction supply process of supplying a writing instruction 512 including an error URL to the NFC I/F 30 during the second period in which the value of the writing flag WF is "1" (S66). Accordingly, the error URL is written in the NFC I/F 30 as the target data SD in place of the wireless profile.

Before the completion of the writing instruction supply process by the controller 40, the NFC I/F 30 of the printer PR receives a Polling signal 520 from the portable terminal PT1 (YES in S130 of FIG. 8) and sends a response signal 522 to the portable terminal PT1 (S140). Accordingly, a communication session is established. Since the value of the writing flag WF is "1", the NFC I/F 30 sends an empty packet to the portable terminal PT1 (NO in S142, S150). That is, data in the data block DB is not sent to the portable terminal PT1.

In response to the completion of the writing process, the controller 40 of the printer PR supplies the WF return instruction 514 to the NFC I/F 30 (S68) to change the value of the writing flag WF to "0" (YES in S120A of FIG. 4, S122A). The point where communication of signals 540 and 542 is performed, and an error URL is sent to the portable terminal PT1 is the same as in the case A of FIG. 5.

Effect of the Second Embodiment

Also in the present embodiment, as shown in the case D of FIG. 9, the printer PR can inhibit the sending of the data in the data block DB to the portable terminal PT1 while the writing instruction supply process for writing the error URL in the NFC I/F 30 is performed. Thus, the printer PR can inhibit the sending of incomplete data to the portable terminal PT1. Although a specific case is not shown in the figure, data in the data block DB is not sent to the portable terminal even when the connecting process or the power OFF process is performed in the printer PR. Thus, the event where the portable terminal that receives the wireless profile cannot joint a target wireless network can be prevented. Also in the present embodiment, the printer can send the target data SD in the NFC I/F 30 to the portable terminal in an appropriate situation.

Correspondence Relationship

The state in which the value of the writing flag WF is "0" and the state in which the value of the writing flag WF is "1" are examples of the "first state" and "second state", respectively. The value of the writing flag WF of "1" and the value of the writing flag WF of "0" are examples of the "third value" and "fourth value", respectively. The WF changing instruction and the WF return instruction are examples of the "second storing instruction" and "second deleting instruction", respectively.

Third Embodiment

The difference of the third embodiment from the first and second embodiments is described below. In the present embodiment, both of a prohibition flag PF in a SRAM 34 and a writing flag WF in a NVRAM 36 are used in the NFC I/F 30. Although not shown in the figure, the process of the processor 32 in the NFC I/F 30 corresponds to a combination of FIGS. 4 and 8. Specifically, the processor 32 performs S100 to S122 of FIG. 4 and S110A, S112A, S120A, and S122A of FIG. 8. The processor 32 performs S130 to S134 of FIG. 4 and thereafter performs S142 to S150 of FIG. 8.

Process of CPU 42; FIGS. 2 and 3

In S40 of FIG. 2 and S64, S82, and S92 of FIG. 3, the CPU 42 supplies the PF changing instruction to the NFC I/F 30 and thereafter supplies the WF changing instruction to the NFC I/F 30. In S44 of FIG. 2 and S68 and S84 in FIG. 3, the CPU 42 supplies the WF return instruction to the NFC I/F 30 and thereafter supplies the PF return instruction to the NFC I/F 30. In S96, the CPU 42 supplies the WF return instruction to the NFC I/F 30. It should be noted that the PF return instruction is not supplied to the NFC I/F 30 in S96. This is because when the power of the printer PR is switched to the OFF state, the value of the prohibition flag PF is changed to "0" due to being volatile. It should be noted that the CPU 42 may supply both of the WF return instruction and the PF return instruction to the NFC I/F 30 in S96 in the modifications.

Case E; FIG. 10

Subsequently, the specific case E achieved by the present embodiment is described below with reference to FIG. 10. In the initial state of the case E of FIG. 9, the printer PR is in the no-error state, and a wireless profile is stored in the data block DB of the NFC I/F 30. The point where communication of signals 600 and 602 is performed, and the wireless profile is sent to a portable terminal PT1 is the same as in the case A of FIG. 5.

The printer PR transfers from the no-error state to the error state during the first period in which a writing instruction supply process is not being performed (YES in S60 of FIG. 3). In this case, the controller 40 of the printer PR firstly supplies a PF changing instruction 610 to the NFC I/F 30 (S64) to change the value of the prohibition flag PF to "1" (YES in S110 of FIG. 4, S112). Subsequently, the controller 40 supplies a WF changing instruction 611 to the NFC I/F 30 (S64) to change the value of the writing flag WF to "1" (YES in S110A of FIG. 8, S112A). Then, the controller 40 performs the writing instruction supply process of supplying a writing instruction 612 including an error URL to the NFC I/F 30 during the second period in which the value of the prohibition flag PF is "1" (S66). Accordingly, the error URL is written in the NFC I/F 30 as the target data SD in place of the wireless profile (YES in S100 of FIG. 4, S102).

Before the completion of the writing instruction supply process by the controller 40, the user compulsorily switches the power of the printer PR from the ON state to the OFF state. For example, the power of the printer PR is compulsorily switched to the OFF state when the operation by the power button PB that is a soft button is not performed, and the operation of another power button that is a hard button is performed. For example, the power of the printer PR is compulsorily switched to the OFF state when the operation of disconnecting the power code of the printer PR from the outlet is performed. When the power of the printer PR is compulsorily switched to the OFF state, the value of the prohibition flag PF is changed to "0" in the NFC I/F 30 due to being volatile. It should be noted that the value of the writing flag WF is maintained to be "1" due to being nonvolatile.

Thereafter, the user of the portable terminal PT1 again brings the portable terminal PT1 to approach the printer PR. Thus, the NFC I/F 30 of the printer PR receives a Polling signal 640 from the portable terminal PT1 (YES in S130 of FIG. 4) and sends a response signal 642 to the portable terminal PT1 (YES in S132, S134). Accordingly, a communication session is established. Since the value of the writing flag WF is "1", the NFC I/F 30 sends an empty packet to the portable terminal PT1 (NO in S142, S150). That is, data in the data block DB is not sent to the portable terminal PT1.

Effect of the Third Embodiment

Also in the present embodiment, the printer PR can send the target data SD in the NFC I/F 30 to the portable terminal in an appropriate situation. As shown in the case E, the PF changing instruction 610 is supplied to the NFC I/F 30, and "1" is stored as the value of the prohibition flag PF. Moreover, the WF changing instruction 611 is supplied to the NFC I/F 30, and "1" is stored as the value of the writing flag WF. Thus, when the communication session with the portable terminal PT1 is established after the power of the printer PR is compulsorily switched to the OFF state, an empty packet is sent to the portable terminal PT1, and data in the data block DB is not sent to the portable terminal PT1. Therefore, for example, the occurrence of the event where data in the data block DB is sent to the portable terminal PT1 while the power of the printer PR is in the OFF state can be prevented. For example, when the power of the printer PR is compulsorily switched to the OFF state in the state in which the wireless profile is stored in the data block DB, sending of the wireless profile to the portable terminal PT1 while the power of the printer PR is in the OFF state can be prevented. In this case, the occurrence of the event where the portable terminal PT1 that receives the wireless profile cannot join a target wireless network can be prevented. For example, if the power of the printer PR is compulsorily switched to the OFF state in the state where the rewriting from the wireless profile to the error URL is performed in the data block DB, the incomplete data being sent to the portable terminal PT1 while the power of the printer PR is in the OFF state can be prevented.

In the present embodiment, the PF changing instruction 610 is supplied prior to the supply of the WF changing instruction 611. If the configuration of supplying the WF changing instruction 611 prior to the supply of the PF changing instruction 610 is employed, a communication session with the portable terminal may be established, and an empty packet may be sent during the period from the supply of the WF changing instruction 611 to the supply of the PF changing instruction 610. If the configuration of supplying the PF return instruction prior to the supply of the WF return instruction is employed in S44 of FIG. 2 or the like, a communication session with the portable terminal may be established, and an empty packet may be sent during the period from the supply of the PF return instruction to the supply of the WF return instruction. In contrast, in the present embodiment, the PF changing instruction 610 is supplied prior to the supply of the WF changing instruction 611, and further, the WF return instruction is supplied prior to the supply of the PF return instruction. Thus, occurrence of the event where the communication session with the portable terminal is established, and an empty packet is sent can be prevented. Accordingly, the processing load of the printer PR can be reduced.

Modification 1

In the embodiments, the CPU 42 of the printer PR changes the operating state of the NFC I/F 30 from the state in which the processor 32 is capable of performing a sending process to the state in which the processor 32 is not capable of performing a sending process when the CPU 42 is to start any of three processes including the writing instruction supply process in S42 of FIG. 2 and S66 of FIG. 3, the connecting process in S83, and the power OFF process in S94 (S40 of FIG. 2, S64, S82, and S92 of FIG. 3). In place of this, the CPU 42 may change the operating state of the NFC I/F 30 when the CPU 42 is to start one or two of the three processes, and the CPU 42 may not change the operating state of the NFC I/F 30 when the CPU 42 is to start any of the other processes of the three processes. For example, the CPU 42 may change the operating state of the NFC I/F 30 when the CPU 42 is to start the power OFF process, and the CPU 42 may not change the operating state of the NFC I/F 30 when the CPU 42 is to start the writing instruction supply process or the connecting process. That is, the "predetermined process" may not include all of the three processes.

Modification 2

The "predetermined process" may be a process other than the three processes described in the modification 1. For example, the CPU 42 may change the operating state of the NFC I/F 30 from the state in which the processor 32 is capable of performing a sending process to the state in which the processor 32 is not capable of performing a sending process when the CPU 42 is to start the print process. Then, the CPU 42 may return the operating state of the NFC I/F 30 to the original state in accordance with the completion of the print process. In this case, while the print process is performed, the wireless profile is not sent to the portable terminal. Accordingly, since the CPU 42 does not receive a connecting request from the portable terminal while the print process is performed, the performing of the connecting process caused by the connection request is avoided, and the hindrance of the connecting process to the print process can be prevented. In the present modification, the print process is an example of the "predetermined process".

Modification 3

The CPU 42 of the printer PR forms a wireless network by causing the state of the printer PR to transfer from the device state of the WFD scheme to the G/O state. In place of this, by starting up the so-called Soft access point (AP), the CPU 42 may form a wireless network in which the printer PR is operated as AP. In the present modification, the CPU 42 prepares a wireless profile (an SSID, a password, and the like) that is to be used in the wireless network in S30 of FIG. 2 or S72 of FIG. 3. Moreover, in S83 of FIG. 3, the CPU 42 establishes a wireless connection with a portable terminal via a wireless LAN I/F 20 in order to cause the portable terminal to join the wireless network. In the present modification, the wireless profile of the wireless network in which the printer PR is operated as AP is an example of the "target data".

Modification 4

The "target data" are not limited to a wireless profile, an error URL, and the like. The "target data" may include, for example, data indicating the status of the printer PR (for example, printing mode, standby mode, and the like) and data for identifying the printer PR (for example, the device name, the MAC address, and the like of the printer PR). That is, the "target data" are only required to be data that are to be sent to an external apparatus.

Modification 5

In the first embodiment, the SRAM 34 stores "0" or "1" as a prohibition flag PF. In place of this, for example, in the state in which the SRAM 34 stores predetermined data indicating a predetermined character string, the processor 32 may not be capable of performing a sending process, and in the state in which the SRAM 34 stores the predetermined data, the processor 32 may be capable of performing a sending process. As in the present modification, the predetermined data may be an example of the "first value", and the "second value" may not be used. In the second embodiment, the NVRAM 36 stores "0" or "1" as a writing flag WF. In place of this, for example, in the state in which the NVRAM 36 stores predetermined data indicating a predetermined character string, the processor 32 may not be capable of performing a sending process, and in the state in which the NVRAM 36 does not store the predetermined data, the processor 32 may be capable of performing a sending process. As in the present modification, the predetermined data may be an example of the "third value", and the "fourth value" may not be used.

Modification 6

In the third embodiment, the PF changing instruction is supplied to the NFC I/F 30 prior to the supply of the WF changing instruction. In place of this, the WF changing instruction may be supplied to the NFC I/F 30 prior to the supply of the PF changing instruction. That is, the order of supplying the "first storing instruction" and the "second storing instruction" is not limited to particular orders. In the third embodiment, the WF return instruction is supplied to the NFC I/F 30 prior to the supply of the PF return instruction. In place of this, the PF return instruction may be supplied to the NFC I/F 30 prior to the supply of the WF return instruction. That is, the order of supplying the "first deleting instruction" and the "second deleting instruction" is not limited to particular orders.

Modification 7

In the second and third embodiments, when the value of the writing flag WF is "0" (NO in S142 of FIG. 8), an empty packet is sent (S150). In place of this, when the value of the writing flag WF is "0", an empty packet may not be sent. In this case, a communication session with the portable terminal is established while no packet is sent to the portable terminal. That is, the "processor" may not send a packet including no target data to an external apparatus.

Modification 8

The NFC I/F 30 may not be a NFC Forum Tag and may be an NFC Forum Device including a processor 32 and memories 34 and 36. Moreover, the printer PR may include, for example, a wireless interface for performing wireless communication according to another scheme such as a Transfer Jet scheme, BlueTooth (registered trademark) scheme, or the like as a substitute for the NFC I/F 30. By way of generalization, the "first wireless interface" is only required to be a wireless interface including the first memory and a processor.

Modification 9

The "communication apparatus" is not limited to the printer PR and may be a scanner, a copy machine, a multifunctional apparatus, a portable terminal, a PC, a server, or the like. The "external apparatus" is not limited to the portable terminals PT1 and PT2 and may be a printer, a scanner, a copy machine, a multifunctional apparatus, PC, a server, or the like.

Modification 10

In the embodiments, the processes of FIGS. 2 and 3 are achieved by performing a program PG (i.e., software) in the memory 44 by the CPU 42 of the printer PR. In place of this, at least one of the processes of FIGS. 2 and 3 may be achieved by hardware such as a logic circuit or the like.

What is claimed is:

1. A communication apparatus comprising:
   a Near Field Communication (NFC) interface;
   a wireless interface being different from the NFC interface; and
   a controller,
   wherein the NFC interface comprises:
      a first memory; and
      a processor configured to perform:
         writing target data in the first memory in accordance with an instruction obtained from the controller, and
         sending the target data in the first memory to an external apparatus,
   wherein the NFC interface is configured to operate in any one of a plurality of operating states including a first state and a second state, the first state being a state in which the processor is capable of sending the target data to the external apparatus, the second state being a state in which the processor is prevented from sending the target data to the external apparatus,
   wherein the sending of the target data to the external apparatus is performed even when power of the communication apparatus is in an OFF state, and
   wherein (a) during a first period in which the power of the communication apparatus is an ON state, an operating state of the NFC interface is the first state capable of sending the target data to the external apparatus, and the first memory stores as the target data a wireless profile to be used by the wireless interface,
      the processor sends the wireless profile stored in the first memory to the external apparatus, the wireless profile being used by the external apparatus whereby the communication apparatus can communicate with the external apparatus via the wireless interface,
   (b) in a case where the controller is to start a predetermined process for switching the power of the communication apparatus from the ON state to the OFF state during the first period,
      the controller changes the operating state of the NFC interface from the first state to the second state in which the processor is prevented from sending the target data to the external apparatus,
   (c) during a second period after the operating state of the NFC interface has been changed from the first state to the second state in which the processor is prevented from sending the target data to the external apparatus,
      the controller performs the predetermined process for switching the power of the communication apparatus from the ON state to the OFF state,
      the processor writes, as the target data in the first memory, off information indicating the OFF state of the communication apparatus in place of the wireless profile, in accordance with the instruction from the controller, and
      the processor does not send the target data stored in the first memory to the external apparatus,
   (d) after the controller has completed the predetermined process and the processor has written the off information in the first memory during the second period,
      the operating state of the NFC interface is changed from the second state to the first state capable of sending the target data to the external apparatus, (e) during a third period after the power of the communication apparatus has been changed to the OFF state in response to the completion of the predetermined process, the operating state of the NFC interface has been changed to the first state capable of sending the target data to the external apparatus, and the off information has been written as the target data in the first memory, the processor sends the off information stored in the first memory in place of the wireless profile to the external apparatus.

2. The communication apparatus as in claim 1, wherein in the second state, the processor does not perform the sending of the target data to the external apparatus by:
even if the processor receives a request signal from the external apparatus, not sending a response signal in response to the request signal to the external apparatus and not establishing a communication session with the external apparatus, the request signal being for establishing the communication session with the external apparatus.

3. The communication apparatus as in claim 1, wherein the NFC interface further comprises a second memory,
in a case where a first value is stored in the second memory, the processor does not perform the sending of the target data to the external apparatus by:
even if the processor receives a request signal from the external apparatus, not sending a response signal in response to the request signal to the external apparatus and not establishing a communication session with the external apparatus, the request signal being for establishing the communication session with the external apparatus,
in a case where the first value is not stored in the second memory, the processor is capable of performing the sending of the target data to the external apparatus,
the controller changes the operating state of the NFC interface from the first state to the second state in the case where the controller is to start the predetermined process during the first period by supplying a first storing instruction for storing the first value in the second memory to the processor.

4. The communication apparatus as in claim 3, wherein the processor is capable of performing the sending of the target data to the external apparatus in a case where the first value is not stored in the second memory and a second value being different from the first value is stored in the second memory,
the first storing instruction is an instruction for storing the first value in the second memory in place of the second value.

5. The communication apparatus as in claim 1, wherein in the second state, the processor does not perform the sending of the target data to the external apparatus by:
not reading the target data from the first memory even if a communication session is established with the external apparatus.

6. The communication apparatus as in claim 5, wherein in the second state, the processor is configured to further perform sending a packet not including the target data to the external apparatus in a case where the communication session is established with the external apparatus.

7. The communication apparatus as in claim 5, wherein the first memory comprises a header block and a data block in which the target data is to be written,
in a case where a third value is stored in the header block, the processor does not perform the sending of the target data to the external apparatus by:
not reading the target data from the data block even if the communication session is established with the external apparatus,
in a case where the third value is not stored in the header block, the processor is capable of performing the sending of the target data to the external apparatus,
the controller changes the operating state of the NFC interface from the first state to the second state in the case where the controller is to start the predetermined process during the first period by supplying a second storing instruction for storing the third value in the header block to the processor, and
the operating state of the NFC interface is changed from the second state to the first state after the controller has completed the predetermined process and the processor has written the off information in the first memory during the second period by the controller supplying a second deleting instruction for deleting the third value from the header block to the processor.

8. The communication apparatus as in claim 7, wherein in a case where the third value is not stored in the header block and a fourth value being different from the third value is stored in the header block, the processor is capable of performing the sending of the target data to the external apparatus,
the second storing instruction is an instruction for storing the third value in the header block in place of the fourth value, and
the second deleting instruction is an instruction for storing the fourth value in the header block in place of the third value.

9. The communication apparatus as in claim 1, wherein in a case where the controller is to start a process for supplying a writing instruction to the processor, the controller changes the operating state of the NFC interface from the first state to the second state in which the processor is prevented from sending the target data to the external apparatus, the writing instruction being for changing a content of the target data in the first memory.

10. The communication apparatus as in claim 1, wherein in a case where the controller is to start a process for establishing a wireless connection via the wireless interface with the external apparatus by using the wireless profile, the controller changes the operating state of the NFC interface from the first state to the second state in which the processor is prevented from sending the target data to the external apparatus.

11. A communication apparatus comprising:
a wireless interface that comprises a nonvolatile memory, a volatile memory and a processor, the nonvolatile memory comprising a header block and a data block in which target data is to be written; and
a controller,
wherein the processor is configured to perform:
a writing process of writing the target data in the data block in accordance with a writing instruction obtained from the controller, the target data being data to be sent to an external apparatus; and
a sending process of sending the target data in the data block to the external apparatus,
the wireless interface is configured to operate in any one of a plurality of operating states including a first state and a second state, the first state being a state in which the processor is capable of performing the sending process, the second state being a state in which the processor is not capable of performing the sending process,
in a case where a first value is stored in the volatile memory, the processor does not perform the sending process by:
even if the processor receives a request signal from the external apparatus, not sending a response signal in response to the request signal to the external apparatus and not establishing a communication session with the external apparatus, the request signal being for establishing the communication session with the external apparatus,
in a case where the first value is not stored in the volatile memory, the processor is capable of performing the sending process,
in a case where a third value is stored in the header block of the nonvolatile memory, the processor does not perform the sending process by:
sending a packet not including the target data to the external apparatus without reading the target data from the data block even if the communication session is established with the external apparatus,
in a case where the third value is not stored in the header block of the nonvolatile memory, the processor is capable of performing the sending process,
wherein the controller is configured to perform:
changing an operating state of the wireless interface from the first state to the second state by supplying a first storing instruction for storing the first value in the volatile memory and a second storing instruction for storing the third value in the header block of the nonvolatile memory to the processor when the controller is to start a predetermined process during a first period in which the controller is not performing the predetermined process and the operating state of the wireless interface is in the first state in which the processor is capable of performing the sending process of sending the target data in the data block to the external apparatus; and
performing the predetermined process during a second period in which the operating state of the wireless interface is the second state, the second period being a period after the operating state of the wireless interface has been changed to the second state,
wherein in a case where the request signal is received from the external apparatus during the second period in which the first value is stored in the volatile memory and the third value is stored in the header block of the nonvolatile memory, the communication session is not established with the external apparatus by not sending the response signal in response to the request signal from the external apparatus, and
in a case where the communication session is established with the external apparatus during a third period in which the first value in the volatile memory is deleted due to a power of the communication apparatus being turned off during the second period and the third value is stored in the header block of the nonvolatile memory and a power of the communication apparatus is turned off, the processor sends the packet to the external apparatus.

12. The communication apparatus as in claim 11, wherein the changing of the operating state of the wireless interface from the first state to the second state includes supplying the second storing instruction to the processor after supplying the first storing instruction to the processor when the controller is to start the predetermined process during the first period.

13. A non-transitory computer-readable recording medium storing computer-readable instructions for a communication apparatus,
the communication apparatus comprises:
a Near Field Communication (NFC) interface;
a wireless interface being different from the NFC interface; and
a controller,
wherein the NFC interface comprises:
a first memory; and
a processor configured to perform:
writing target data in the first memory in accordance with an instruction obtained from the controller; and
sending the target data in the first memory to an external apparatus,
wherein the NFC interface is configured to operate in any one of a plurality of operating states including a first state and a second state, the first state being a state in which the processor is capable of sending the target data to the external apparatus, the second state being a state in which the processor is prevented from sending the target data to the external apparatus,
wherein the sending of the target data to the external apparatus is performed even when power of the communication apparatus is in an OFF state, and
wherein (a) during a first period in which the power of the communication apparatus is an ON state, an operating state of the NFC interface is the first state capable of sending the target data to the external apparatus, and the first memory stores as the target data a wireless profile to be used by the wireless interface,
the processor sends the wireless profile stored in the first memory to the external apparatus, the wireless profile being be used by the external apparatus whereby the communication apparatus can communicate with the external apparatus via the wireless interface,
(b) in a case where the controller is to start a predetermined process for switching the power of the communication apparatus from the ON state to the OFF state during the first period,
the computer-readable instructions, when executed by the controller, causing the communication apparatus to perform:
changing the operating state of the NFC interface from the first state to the second state in which the processor is prevented from sending the target data to the external apparatus,
(c) during a second period after the operating state of the NFC interface has been changed from the first state to the second state in which the processor is prevented from sending the target data to the external apparatus,
performing the predetermined process for switching the power of the communication apparatus from the ON state to the OFF state,
the processor writes, as the target data in the first memory, off information indicating the OFF state of the communication apparatus in place of the wireless profile, in accordance with the instruction from the controller, and the processor does not send the target data stored in the first memory to the external apparatus,
(d) after the controller has completed the predetermined process and the processor has written the off information in the first memory during the second period, the operating state of the NFC interface is changed from the second state to the first state capable of sending the target data to the external apparatus,
(e) during a third period after the power of the communication apparatus has been changed to the OFF state in response to the completion of the predetermined process, the operating state of the NFC interface has been changed to the first state capable of sending the target data to the external apparatus, and the off information has been written as the target data in the first memory,
the processor sends the off information stored in the first memory in place of the wireless profile.

14. A method performed by a controller of a communication apparatus, the communication apparatus comprises:
a Near Field Communication (NFC) interface;
a wireless interface being different from the NFC interface; and
the controller,
wherein the NFC interface comprises:
a first memory; and
a processor configured to perform:
writing target data in the first memory in accordance with an instruction obtained from the controller; and
sending the target data in the first memory to an external apparatus,
wherein the NFC interface is configured to operate in any one of a plurality of operating states including a first state and a second state, the first state being a state in which the processor is capable of sending the target data to the external apparatus, the second state being a state in which the processor is not capable of prevented from sending the target data to the external apparatus,
wherein the sending of the target data to the external apparatus is performed even when power of the communication apparatus is in an OFF state, and
wherein (a) during a first period in which the power of the communication apparatus is an ON state, an operating state of the NFC interface is the first state capable of sending the target data to the external apparatus, and the first memory stores as the target data a wireless profile to be used by the wireless interface,
the processor sends the wireless profile stored in the first memory to the external apparatus, the wireless profile being used by the external apparatus whereby the communication apparatus can communicate with the external apparatus via the wireless interface,
(b) in a case where the controller is to start a predetermined process for switching the power of the communication apparatus from the ON state to the OFF state during the first period,
the method comprising:
changing operating state of the NFC interface from the first state to the second state in which the processor is prevented from not capable of sending the target data to the external apparatus,
(c) during a second period after the operating state of the NFC interface has been changed from the first state to the second state in which the processor is prevented from not capable of sending the target data to the external apparatus,
performing the predetermined process for switching the power of the communication apparatus from the ON state to the OFF state,
the processor writes, as the target data in the first memory, off information indicating the OFF state of the communication apparatus in place of the wireless profile, in accordance with the instruction from the controller, and
the processor does not send the target data stored in the first memory to the external apparatus,
(d) after the controller has completed the predetermined process and the processor has written the off information in the first memory during the second period,
the operating state of the NFC interface is changed from the second state to the first state capable of sending the target data to the external apparatus, and
(e) during a third period after the power of the communication apparatus has been changed to the OFF state in response to the completion of the predetermined process, the operating state of the NFC interface has been changed to the first state capable of sending the target data to the external apparatus, and the off information has been written as the target data in the first memory,
the processor sends the off information stored in the first memory in place of the wireless profile to the external apparatus.

* * * * *